(12) United States Patent
Nagao

(10) Patent No.: US 9,894,978 B2
(45) Date of Patent: Feb. 20, 2018

(54) DRAWING APPARATUS AND DRAWING METHOD FOR DRAWING APPARATUS

(71) Applicant: CASIO COMPUTER CO., LTD., Shibuya-ku, Tokyo (JP)

(72) Inventor: Tomoyuki Nagao, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/233,607

(22) Filed: Aug. 10, 2016

(65) Prior Publication Data

US 2017/0065053 A1    Mar. 9, 2017

(30) Foreign Application Priority Data

Sep. 4, 2015    (JP) ................. 2015-174275

(51) Int. Cl.
| | | |
|---|---|---|
| G06K 15/22 | (2006.01) | |
| A45D 29/22 | (2006.01) | |
| A45D 34/04 | (2006.01) | |
| G06T 7/00 | (2017.01) | |
| B43L 13/02 | (2006.01) | |
| A45D 29/00 | (2006.01) | |

(52) U.S. Cl.
CPC ........... *A45D 29/22* (2013.01); *A45D 34/041* (2013.01); *A45D 34/042* (2013.01); *B43L 13/024* (2013.01); *G06T 7/001* (2013.01); *G06T 7/0002* (2013.01); *A45D 2029/005* (2013.01); *G06T 2207/30144* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 5,261,038 A | * | 11/1993 | Adroher | G01D 15/16 358/1.3 |
| 6,286,517 B1 | * | 9/2001 | Weber | A45D 29/00 132/200 |
| 6,447,091 B1 | * | 9/2002 | Calvo | B41J 2/16579 347/19 |
| 6,517,184 B1 | * | 2/2003 | Bruch | B41J 2/16579 347/19 |
| 6,538,770 B1 | * | 3/2003 | Mestha | H04N 1/00002 358/1.9 |
| 6,565,179 B1 | * | 5/2003 | Bruch | B41J 2/16579 347/14 |
| 2002/0027575 A1 | * | 3/2002 | Bruch | B41J 2/0451 347/19 |

(Continued)

FOREIGN PATENT DOCUMENTS

JP    2003534083 A    11/2003

*Primary Examiner* — Ted Barnes
(74) *Attorney, Agent, or Firm* — Holtz Holtz & Volek PC

(57) ABSTRACT

A drawing apparatus including a drawing head to which a drawing tool is mounted, the drawing tool drawing on a drawing object; a drawing testing portion having a drawing media on which an image is drawn by the drawing tool; and a control unit.
The control unit interrupts drawing on the drawing object by the drawing tool and attempts drawing on the drawing media by the drawing tool in the drawing testing portion when the drawing on the drawing object by the drawing tool is not performed correctly.

20 Claims, 10 Drawing Sheets

(56) References Cited

U.S. PATENT DOCUMENTS

| | | | |
|---|---|---|---|
| 2003/0117455 A1* | 6/2003 | Bruch | B41J 2/16579 347/23 |
| 2007/0109310 A1 | 5/2007 | Xu et al. | |
| 2009/0059266 A1* | 3/2009 | Jackson | H04N 1/00002 358/1.14 |
| 2011/0018880 A1 | 1/2011 | Whited et al. | |
| 2011/0225331 A1 | 9/2011 | Dodge et al. | |
| 2011/0261060 A1 | 10/2011 | Waibel et al. | |
| 2014/0232802 A1* | 8/2014 | Bitoh | B41J 2/49 347/110 |
| 2015/0138264 A1* | 5/2015 | Yamasaki | B41J 3/407 347/9 |
| 2015/0201734 A1* | 7/2015 | Yamasaki | A45D 34/04 132/200 |
| 2016/0297209 A1* | 10/2016 | Palumbo | B41J 3/407 |

* cited by examiner

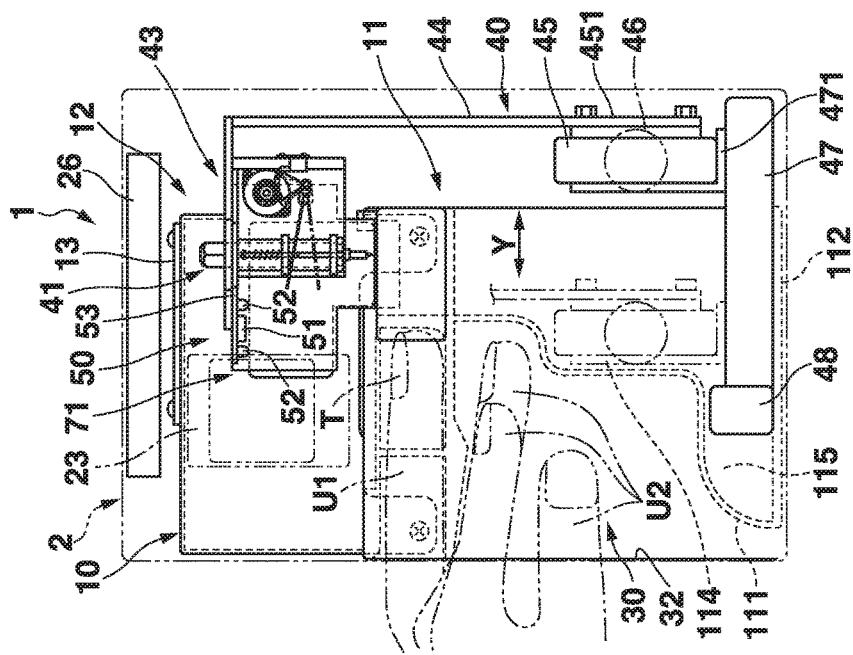
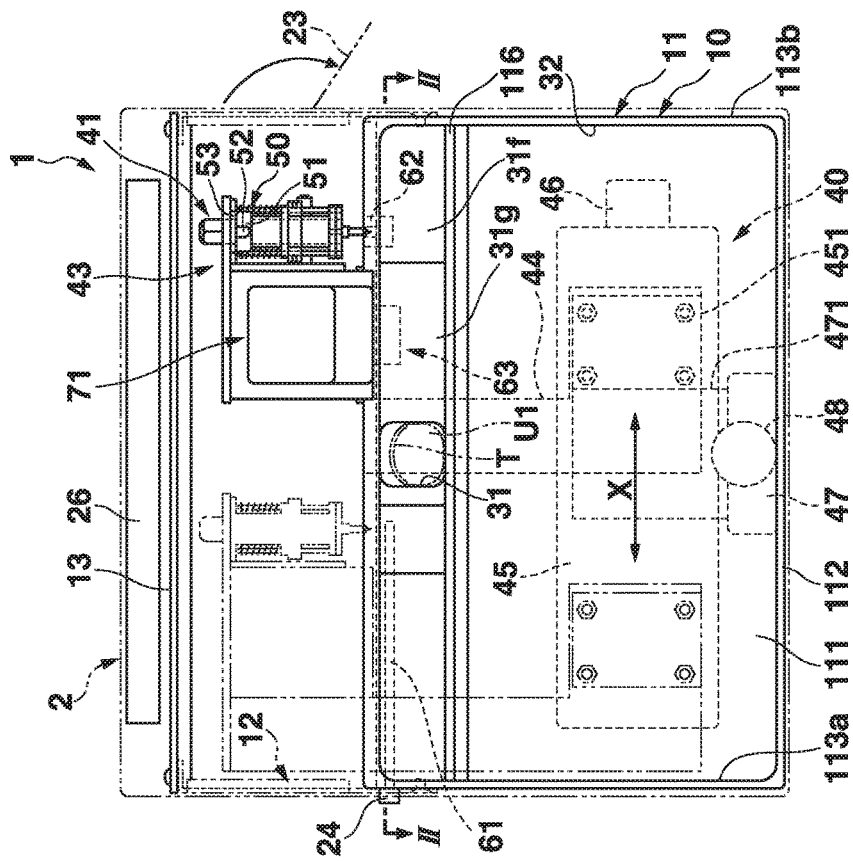
FIG.1A
FIG.1B

DRAWING APPARATUS AND DRAWING METHOD FOR DRAWING APPARATUS

CROSS-REFERENCE TO RELATED APPLICATIONS

The present invention contains subject matter related to Japanese Patent Application No. 2015-174275 filed in the Japanese Patent Office on Sep. 4, 2015, the entire contents of which are incorporated herein by reference.

BACKGROUND OF THE INVENTION

1. Field of the Invention

The present invention relates to a drawing apparatus and a drawing method for a drawing apparatus.

2. Description of the Related Art

Conventionally, nail printing apparatuses for printing desired nail designs on nails of human fingers are known. An example of such a nail printing apparatus is described in Japanese Unexamined Patent Application Publication (Translation of PCT Application) No. 2003-534083. Such nail printing apparatuses are configured to apply printing of a design on a nail by an ink jet printing method.

Further, providing such nail printing apparatuses with plotter drawing functions using a pen has been considered. In this case, with the pen, ink can be used that is difficult to print in ink jet printing, such as ink of comparatively high viscosity and ink in which the size of the particles of the coloring is comparatively large. An example of such an ink is a base layer ink. In this case, the nail printing apparatus is configured to apply the base layer ink on the nail using the pen and, thereafter, apply printing of a design on top of the drawn base layer ink using ink jet printing.

In cases where a nail printing apparatus is provided with plotter drawing functions, a ballpoint pen, for example, is used as the pen. In cases where drawing is attempted on a nail using this type of pen, there are cases where ink is not discharged from the pen and, for example, ink is not applied to a portion of an intended drawing region. A main cause of this is that the ball of the pen tip does not smoothly rotate due to debris or the like, which leads to the drawing not being able to be applied on the nail. Another cause is running out of ink.

In cases where drawing processing is allowed to progress in a state where the ink has not been applied by the pen to a portion of the intended drawing region, the application of the nail design may fail. Specifically, in cases where applying base layer ink using a pen, in a case where drawing processing is allowed to progress in a state where the ink has not been applied by the pen to a portion of the intended drawing region, regions will be produced where the ink jet printing is not applied on the base layer ink. As a result, the finish may differ from the desired design and the application of the nail design may fail. Furthermore, the ink that has been ink jet printed in the regions where the base layer ink is not applied will easily peel, and the durability of the nail design will decline. For example, the ink that has been ink jet printed may peel when washing or rubbing the nail.

BRIEF SUMMARY OF THE INVENTION

An advantage of the present invention is that a drawing apparatus and a drawing method for a drawing apparatus can be provided whereby failures in the application of a nail design and declines in design durability can be prevented.

The drawing apparatus of the present invention by which this advantage is obtained includes a drawing head to which a drawing tool is mounted, the drawing tool drawing on a drawing object; a drawing testing portion which has a drawing media on which an image is drawn by the drawing tool; and a control unit which interrupts drawing on the drawing object by the drawing tool during the drawing on the drawing object by the drawing tool and attempts drawing on the drawing media by the drawing tool in the drawing testing portion when the drawing on the drawing object by the drawing tool is not performed correctly.

In the drawing method for a drawing apparatus of the present invention by which this advantage is obtained, the drawing apparatus includes a drawing head to which a drawing tool is mounted, the drawing tool drawing on a drawing object; and a drawing testing portion which has a drawing media on which an image is drawn by the drawing tool. The drawing method includes the step of interrupting drawing on the drawing object by the drawing tool during the drawing on the drawing object by the drawing tool and attempting drawing on the drawing media by the drawing tool in the drawing testing portion when the drawing on the drawing object by the drawing tool is not performed correctly.

BRIEF DESCRIPTION OF THE SEVERAL VIEWS OF THE DRAWING

FIG. 1A is a front view of a drawing apparatus according to an embodiment of the present invention. FIG. 1B is a side view illustrating an internal configuration of the drawing apparatus depicted in FIG. 1A.

DETAILED DESCRIPTION OF THE INVENTION

Figure 2A:
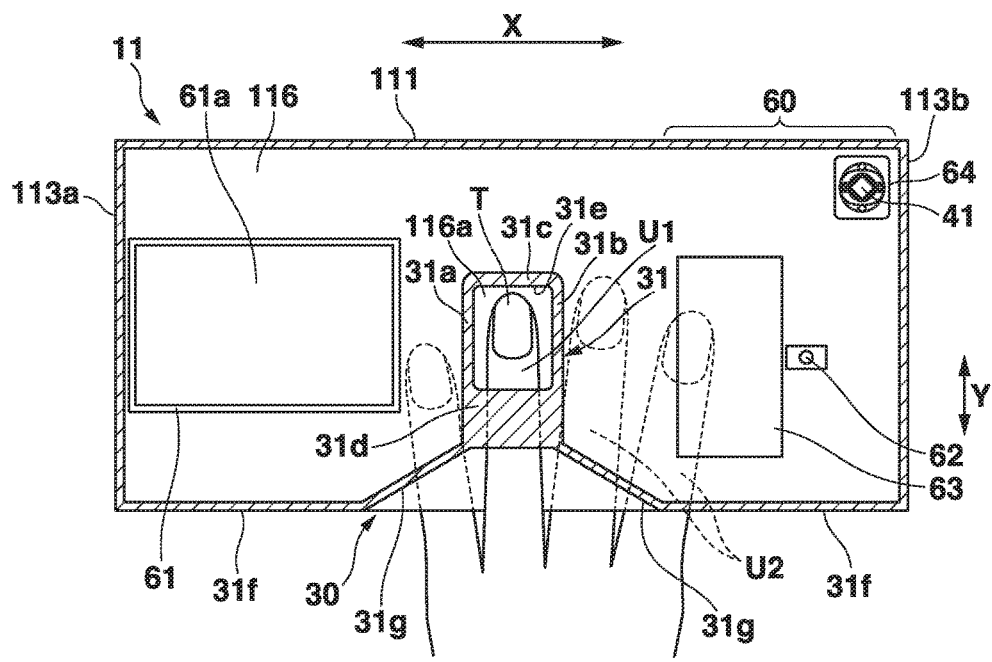
FIG. 2A is a cross-sectional view taken along line II-II in FIG. 1A.

Embodiments of the nail printing apparatus (drawing apparatus) and drawing method for the nail printing apparatus (drawing apparatus) according to the present invention are described below in detail while referring to the drawings.

While various limitations, which are technically preferable from the perspective of carrying out the present invention, are placed on the embodiments described below, the scope of the present invention should not be construed to be limited to these embodiments or the examples illustrated in the drawings.

In the following embodiments, a nail printing apparatus will be described as an apparatus for drawing on a drawing object, namely the surface of a fingernail. However, the drawing object of the present invention is not limited to the surface of a fingernail and, for example, may be the surface of a toenail.

First Embodiment

FIG. 1A is a front view of a nail printing apparatus, illustrating an internal configuration of the nail printing apparatus. FIG. 1B is a side view illustrating the internal configuration of the nail printing apparatus depicted in FIG. 1A.

FIG. 2A is a cross-sectional view taken along line II-II of FIG. 1A.

As illustrated in FIGS. 1A and 1B, in the nail printing apparatus 1 of the present embodiment, a drawing head 43 is provided with drawing tools, namely a pen 41, and an ink jet drawing portion 71. The nail printing apparatus 1 of the present embodiment uses plotter printing and ink jet printing to apply a drawing on a nail T of a print finger U1.

The nail printing apparatus 1 is provided with a case body 2 and an apparatus main body 10 housed in the case body 2.

A cover 23, configured to be openable and closeable, for replacing the pen 41 and the ink jet drawing portion 71 of the hereinafter described drawing unit 40 is provided in an end of an upper portion of a side surface of the case body 2.

The cover 23 is rotatable via, for example, a hinge or the like, from a closed state to an open state, as illustrated in FIG. 1A.

An operation unit 25 (see FIG. 4) is set on an upper surface (top panel) of the case body 2.

The operation unit 25 is an input unit where a user performs various types of input.

Operation buttons (not illustrated in the drawings) for performing various types of input are set in the operation unit 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display unit 26 is set approximately in a center portion of the top surface (top panel) of the case body 2.

The display unit 26 is configured from, for example, a liquid crystal display (LCD), an organic electroluminescence display, or other type of flat display.

In the present embodiment, examples of images appropriately displayed on the display unit 26 include nail images obtained by imaging the print finger U1 (finger images including images of the nail T), images of the outline or the like of the nail T included in the nail images, design selection images for selecting a design image to be drawn on the nail T, thumbnail images for design confirmation, command screens or selection screens displaying various commands or selections, and the like.

Note that a configuration is possible in which a touch panel for performing various types of input is integrated into the surface of the display unit 26.

The apparatus main body 10 is formed into a rough box-shape and is provided with a lower frame 11 set in the lower portion of the interior of the case body 2, and an upper frame 12 set above the lower frame 11 and in the upper portion of the interior of the case body 2.

First, the lower frame 11 will be described.

The lower frame 11 has a back surface plate 111, a bottom plate 112, a pair of left and right side plates 113a and 113b, an X-direction movement stage housing 114, a Y-direction movement stage housing 115, and a dividing wall 116.

Bottom edges of the side plates 113a and 113b are joined respectively to left and right edges of the bottom plate 112. The side plates 113a and 113b are provided in an upright state on the bottom plate 112.

A lower portion of the back surface plate 111 is formed so as to sink forward (toward the finger insertion direction proximal side) in two stages. The bottom edge of the back surface plate 111 is joined to a front edge of the bottom plate 112, and the back surface plate 111 divides the area surrounded by the bottom plate 112 and the side plates 113a and 113b into front and back.

The space formed on the back side of the sunken back surface plate 111 becomes the X-direction movement stage housing 114 and the Y-direction movement stage housing 115 (see FIG. 1B).

An X-direction movement stage 45 of the drawing unit 40 is housed in the X-direction movement stage housing 114 when the drawing unit 40 is moved forward (toward the finger insertion direction proximal side). A Y-direction movement stage 47 of the drawing unit 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113 a and 113 b).

The dividing wall 116 is provided roughly horizontally, left and right edges of the dividing wall 116 are joined respectively to the side plates 113a and 113 b, and a back edge of the dividing wall 116 is joined to the back surface plate 111.

A finger securing portion 30 (see FIG. 1B) is provided integrally in the lower frame 11.

The finger securing portion 30 is configured from a finger receiving portion 31 for receiving the finger corresponding to the nail T on which drawing will be performed (hereinafter referred to as "print finger U1"), and a finger clearing portion 32 for clearing fingers other than the print finger U1 (hereinafter referred to as "non-print fingers U2").

The finger receiving portion 31 is disposed on an upper side of the dividing wall 116 and roughly in a center portion in a width direction of the lower frame 11. The space on the lower side of the lower frame 11, partitioned by the dividing wall 116, forms the finger clearing portion 32.

For example, in cases where applying a drawing on the nail T of a ring finger, the ring finger is inserted into the finger receiving portion 31 as the print finger U1, and the non-print fingers U2, namely the other four fingers (thumb, index finger, middle finger, and little finger) are inserted into the finger clearing portion 32.

As illustrated in FIGS. 1B and 2A, the finger receiving portion 31 is open to a front surface side of the lower frame 11 (print finger insertion direction proximal side); and a bottom side is defined by a finger mount portion 116a that constitutes a portion of the dividing wall 116, sides are defined by partitions 31a and 31b, and a rear side is defined by a partition 31c. The finger mount portion 116a is a constituent where the finger (the print finger U1) of the nail T on which drawing is to be performed is mounted on the X-Y plane.

A top side of the finger receiving portion 31 is defined by a ceiling portion 31d. A window 31e is formed in the ceiling portion 31d for exposing the nail T of the print finger U1 inserted into the finger receiving portion 31.

A front wall 31f (see FIG. 1A) that closes the front surface side of the lower frame 11 is provided on the top surface of the dividing wall 116, at both end portions on the front surface side of the lower frame 11.

A pair of guide walls 31g (see FIG. 1A) that guides the print finger U1 into the finger receiving portion 31 is erected on the top surface of the dividing wall 116, and the pair of guide walls 31g narrows from the end of the front wall 31f on the center portion side toward the finger receiving portion 31.

A user can pinch the dividing wall 116 between the print finger U1 inserted into the finger receiving portion 31 and the non-print fingers U2 inserted into the finger clearing portion 32. Thus, the print finger U1 inserted into the finger receiving portion 31 is stably secured.

A test drawing portion (drawing testing portion) 61 is provided on the top surface of the lower frame 11, beside the finger receiving portion 31 (location corresponding to a media access port 24 of the case body 2, on the left side in FIGS. 1A and 2A). The test drawing portion 61 is for applying test drawing on a drawing media 61a by the pen 41, within a drawable area of the drawing head 43 (described hereinafter).

The test drawing portion 61 is an example of a drawing testing portion for confirming whether or not the test drawing by the pen 41 is performed correctly, and the drawing testing portion may be provided at another location than the test drawing portion 61.

Additionally, the test drawing portion 61 if formed by sinking a portion of the top surface of the lower frame 11, and a height of the test drawing portion 61 is preferably configured so as to be roughly the same as a height of the nail T when the print finger U1 is inserted into the finger receiving portion 31.

The test drawing portion 61 is a flat portion and is configured so that drawing media 61a inserted through the media access port 24 of the case body 2 is mounted thereon.

The drawing media 61a mounted on the test drawing portion 61 is not limited, provided that drawing by the pen tip (tip portion) 413 is possible, the pen tip 413 can be warmed-up, and test drawing can be drawn, and for example, may be a piece of paper.

A home area 60 where the drawing head 43 stands by at times when the drawing head 43 is not drawing is provided on the top surface of the lower frame 11, beside the finger receiving portion 31 (in the present embodiment, the right side in FIGS. 1A and 2A), within a movable range of the drawing head 43 described hereinafter.

A number of pen caps 62 (in the present embodiment, one) exactly corresponding to the pen holder 42 described hereinafter are set in the home area 60.

The pen cap 62 is, for example, formed from rubber and, when the pen 41 is in a state mounted in the drawing unit 40 but not applying drawing (when not drawing), the pen 41 is lowered and the pen tip 413 is stored in the pen cap 62. As a result, drying out of the pen tip 413 is prevented.

An ink jet maintenance portion 63 is provided within the home area 60, at a position corresponding to a position where the ink jet drawing portion 71 is disposed when the pen tip 413 is stored in the pen cap 62. The ink jet maintenance portion 63 is configured from, for example, a cleaning mechanism for cleaning an ink discharging portion (nozzle surface) of the ink jet drawing portion 71 described hereinafter, a cap mechanism for maintaining moist conditions of the ink discharging portion (nozzle surface), and the like (all not illustrated in the drawings).

A pen stocker 64 is provided in the home area 60.

The pen 41 to be mounted to the drawing head 43 (described hereinafter) is stored in the pen stocker 64.

The pen stocker 64 is a member exhibiting a cylindrical shape, and the pen 41 is inserted from above and is stored in the pen stocker 64.

As such, the pen 41 can be easily replaced by opening the cover 23 of the case body 2 and, for example, using hands or tweezers to grab a top end portion of the pen 41 and lift the pen 41 out.

Note that the disposal of the pen cap 62, the ink jet maintenance portion 63, the pen stocker 64, and the like in the home area 60 is not limited to the examples described herein.

The drawing unit 40 is configured from and provided with the drawing head 43, a unit supporting member 44 that supports the drawing head 43, the X-direction movement stage 45 for moving the drawing head 43 in the X direction (the X direction in FIGS. 1A and 2A; the left-right direction of the drawing apparatus 1), an X-direction movement motor 46, the Y-direction movement stage 47 for moving the drawing head 43 in the Y direction (the Y direction in FIGS. 1B and 2A; the front-back direction of the drawing apparatus 1), a Y-direction movement motor 48, and the like.

Figure 3A:
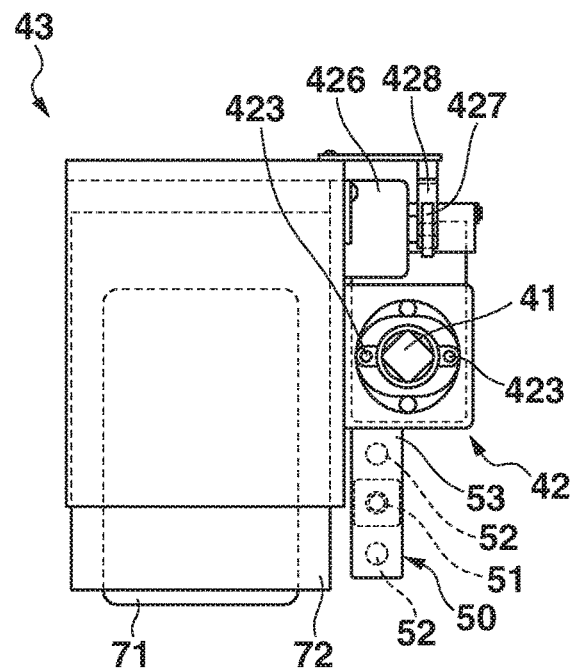
FIG. 3A is a top view of a drawing head according to the embodiment of the present invention.
Figure 3B:
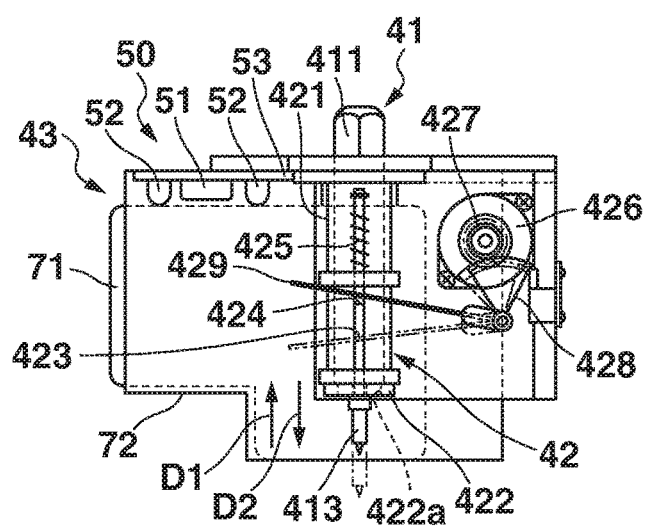
FIG. 3B is a side view of the drawing head according to the embodiment of the present invention.

FIG. 3A is a top view of a drawing head and FIG. 3B is a side view of the drawing head according to the present embodiment.

As illustrated in FIGS. 3A and 3B, in the drawing head 43 of the present embodiment, the pen holder 42 holding the pen 41 and an ink jet holder 72 holding the ink jet drawing portion 71 are disposed adjacently to each other.

The ink jet drawing portion 71 is, for example, an ink cartridge-integrated head in which ink cartridges (not illustrated in the drawings) corresponding to yellow (Y), magenta (M), and cyan (C) ink are formed integrally with an ink discharging portion (not illustrated in the drawings) provided on a surface (in the present embodiment, the bottom surface in FIG. 1A and the like) facing the drawing object (the nail T) in each of the ink cartridges.

The ink discharging portion is provided with a nozzle array consisting of a plurality of nozzles for spraying each color of ink. The ink jet drawing portion 71 micronizes the ink and applies the drawing by spraying the ink from the ink discharging portion directly on the target drawing surface of the drawing object (the nail T).

Note that the ink jet drawing portion 71 is not limited to those that discharge the three colors of ink described previously. Ink cartridges holding other ink and ink discharging portions may also be provided.

One pen 41 is mountable in the pen holder 42 of the present embodiment.

The pen 41 is a writing utensil for applying a drawing on a drawing object, namely the surface of the nail T; and specifically is a writing utensil for applying a drawing by the tip portion thereof being brought into contact with the drawing object, namely the surface of the nail T.

As illustrated in FIG. 3B and the like, the pen 41 is provided with the pen tip 413 on a tip side of a rod-like pen shaft portion 411 (the lower side in FIG. 3B).

An interior of the pen shaft portion 411 is an ink storing portion for storing various types of ink.

Any type of ink can be stored in the interior of the pen shaft portion 411. Viscosity of ink, diameter of the coloring particles (particle size), and the like are not particularly limited. For example, white ink, light pink ink, ink having metallic glitter, UV-curable ink, ink for gel nails, ink for under coats, ink for top coats, nail varnish, and the like can be used.

In the present embodiment, a case is described in which white ink used for a base layer is stored in the pen shaft portion 411, and the pen 41 is used to draw a white base (white base layer) on the nail T.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like.

The pen 41 having the pen tip 413 of any desired thickness may be provided as well.

The pens 41 that are held in the pen holder 42 may be pens that all have the same type of the pen tip 413, or may be pens that have different types of the pen tip 413.

The pen 41 is inserted from above and mounted (exchanged) in the pen holder 42 of the drawing head 43 from the pen stocker 64 of the home area 60.

An exchanging unit 90 (see FIG. 4) is provided in the home area 60 for exchanging the pen 41 of the drawing head 43 with the pen 41 in the pen stocker 64.

The pens 41 can be exchanged between the pen stocker 64 and the pen holder 42 by the exchanging unit 90 while the drawing head 43 is standing by at the home area 60.

The exchanging unit 90 is connected to a drawing control portion 815 of a control device 80 (described hereinafter, see FIG. 4), and is configured to be controlled by the drawing control portion 815.

Note that information related to the pen 41 such as the shape and thickness of the pen 41 stored in the pen stocker 64, the type of ink stored, and the like is stored in advance in a pen information memory region 824 (see FIG. 4) of a memory unit 82.

The pen holder 42 is provided with a tubular member 421 that is open vertically and into which the pen 41 is inserted, a pen retaining member 422 disposed so as to block an opening on a bottom side of the tubular member 421 (the bottom side in FIG. 3B), and an auxiliary rod member 423 that moves vertically with the pen 41.

A retaining hole 422a that retains the tip side of the pen shaft portion 411 of the pen 41 is formed in the pen retaining member 422.

The pen 41 is retained in the pen holder 42 by the tip side of the pen shaft portion 411 being inserted in the retaining hole 422a of the pen retaining member 422. Note that screw grooves (not illustrated in the drawings) may be formed in an outer circumferential surface of the tip side of the pen shaft portion 411, screw grooves (not illustrated in the drawings) capable of mating with the screw grooves of the shaft portion may be formed in an inner circumferential surface of the retaining hole 422a, and the pen 41 may be retained in the retaining hole 422a by screwing the screw grooves on the pen shaft portion 411 side into the screw grooves on the retaining hole 422a side.

Two auxiliary rod members 423 are disposed so as to sandwich the pen 41.

A bottom end of each of the auxiliary rod members 423 is mated with the pen retaining member 422 and, thereby, the auxiliary rod members 423 are fixed so as to be parallel with the pen shaft portion 411 of the pen 41.

A retaining protrusion 424 protruding in a direction away from the axial center of the pen 41 is provided on the auxiliary rod members 423.

A coil spring 425 is wrapped around the rod of the auxiliary rod members 423.

The coil spring 425 is configured to apply force in an upward direction D1 to the auxiliary rod member 423 in a state free of outside forces and holds the position of the pen 41 when not drawing at a position where the pen tip 413 does not contact the nail T.

A pen vertical motor 426 constituted by a stepping motor, a gear 428 that engages with a gear 427 attached to a rotating shaft of the pen vertical motor 426, and a plate spring 429 that pivots along with the rotation of the gear 428 are provided in the vicinity of the pen holder 42.

In the present embodiment, a lifting mechanism of the pen 41 is constituted by the pen vertical motor 426, the gear 427, the gear 428, the plate spring 429, and the like.

Here, the plate spring 429 engages with the retaining protrusion 424 provided on the auxiliary rod member 423 and presses the retaining protrusion 424 down, thereby pressing the pen 41 in a downward direction D2.

That is, when the plate spring 429 pivots along with the rotation of the pen vertical motor 426 and the plate spring 429 engages with the retaining protrusion 424 and presses the retaining protrusion 424 downward, the pen 41 is pressed in the downward direction D2 against the biasing force of the coil spring 425.

The present embodiment has a configuration in which the pen 41 is not pressed down directly by the plate spring 429; instead, the plate spring 429 presses down on the retaining protrusion 424, and the plate spring 429 is not disposed over the pen 41. Therefore, replacement of the pen 41 can be easily performed, a height of the lifting mechanism of the pen 41 can be kept relatively low, and space can be saved.

Next, a detailed description of the lifting mechanism of the pen 41 is given.

First, when not drawing, the plate spring 429 is in a state where not applying outside pressure to the retaining protrusion 424. In the state where outside pressure (pressing force by the plate spring 429) is not applied, the pen 41 is pressed up in the upward direction D1 (the upward direction in FIGS. 1A and 3B) by the biasing force of the coil spring 425, and the tip side of the pen 41, that is, the pen tip 413, is separated from the drawing object, namely the surface of the nail T, and held at a height where not contacting the surface.

On the other hand, when drawing, the pen vertical motor 426 rotates a prescribed number of steps and the plate spring 429 presses the retaining protrusion 424 down. Thereby, the pen 41 is pressed down in the downward direction D2.

The prescribed number of steps when driving the pen vertical motor 426 is appropriately set depending on a height and the like of the nail T of the print finger U1 inserted into the finger receiving portion 31.

That is, in the nail printing apparatus 1 of the present embodiment, nail information (described hereinafter) is acquired in advance. Moreover, the height of the nail T at a contact position where the tip side of the pen 41, namely the pen tip 413, contacts the nail T is confirmed on the basis of the nail information, and the number of steps of the pen vertical motor 426 is determined on the basis of the height. The pen vertical motor 426 is driven the determined number of steps and the plate spring 429 presses the pen 41 down. Thus, the tip side of the pen 41, namely the pen tip 413 is moved toward to contact the surface of the nail T and an appropriate amount of pen pressure is applied.

Note that when drawing, the height of the location of the nail T where the drawing is being applied changes throughout the drawing along with changes in the position being drawn on. Each time a change occurs, the number of steps of the pen vertical motor 426 is increased or decreased, so that the pen pressure of the pen 41 is adjusted. Thus, drawing is performed while making adjustments to ensure that the pen pressure is roughly constant.

Here, the adjustment to the pen pressure by increasing or decreasing the number of steps of the pen vertical motor 426 is performed each time a change occurs, when the change in the height of the nail T changes a predetermined amount (e.g. 0.5 mm) When the change in the height of the nail T is less than the predetermined amount, no adjustment is made to the pen pressure. In these cases, the pen 41 will automatically move vertically due to the plate spring 429 flexibly deforming (elastically deforming) along with the shape of the nail T and, thus, the pen 41 can be made to reliably contact the nail T and, simultaneously, the pen pressure can be maintained at a suitable value.

Note that a spring constant of the plate spring 429 is not that great and is set to a value of a magnitude where pain is not felt by the nail T when the pressing force (outside force) of the plate spring 429 is applied to the nail T.

When drawing, impact due to the vertical movement of the pen 41 is absorbed by the plate spring 429 flexing a suitable degree and the pen 41 moves vertically along with the height of the nail T while maintaining a suitable degree of pen pressure of the pen tip 413 in a roughly constant manner. Thus, the desired nail design can be drawn neatly on the surface of the drawing object, namely the nail T.

The unit supporting member 44 is fixed to the X-direction movement portion 451 that is attached to the X-direction movement stage 45. The X-direction movement portion 451 is configured to move in the X direction along guides (not illustrated in the drawings) on the X-direction movement stage 45 via the driving of the X-direction movement motor 46. Thus, the drawing head 43 that is attached to the unit supporting member 44 is configured to move in the X direction (the X direction in FIG. 1A and the left-right direction of the nail printing apparatus 1).

The X-direction movement stage 45 is fixed to a Y-direction movement portion 471 of the Y-direction movement stage 47. The Y-direction movement portion 471 is configured to move in the Y direction along guides (not illustrated in the drawings) on the Y-direction movement stage 47 via the driving of the Y-direction movement motor 48. Thus, the drawing head 43 that is attached to the unit supporting member 44 is configured to move in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and ball screws and guides (not illustrated in the drawings).

In the present embodiment, a head movement portion 49 (see FIG. 4) is configured as an XY drive unit that drives the drawing head 43 provided with the pen 41 in the X direction and the Y direction via the X-direction movement motor 46, the Y-direction movement motor 48, and the like.

The pen vertical motor 426, the ink jet drawing portion 71, the X-direction movement motor 46, and the Y-direction movement motor 48 of the drawing unit 40 are connected to the drawing control portion 815 of the control device 80 (described hereinafter, see FIG. 4), and are configured to be controlled by the drawing control portion 815.

An imaging unit 50 is provided with an image capturing device 51 and an illumination device 52.

The imaging unit 50 images the print finger U1 using the image capturing device 51 while illuminating the nail T of the print finger U1, which is inserted into the finger receiving portion 31 and can be seen through the window 31e, using the illumination device 52. The imaging unit 50 acquires images, namely nail images (images of fingers including nail images), of the nail T of the print finger U1, and is used to image the state of drawing by the pen 41 on the nail T.

In the present embodiment, the image capturing device 51 and the illumination device 52 are fixed on a side (the right side of the drawing head 43 in FIG. 1A) of the drawing head 43 of the drawing unit 40. Specifically, as illustrated in FIG. 3A, a substrate 53 is attached to a first edge (the right side in FIG. 3A) of the drawing head 43 of the drawing unit 40, and the image capturing device 51 and the illumination device 52 constituting the imaging unit 50 are provided on a lower surface of the substrate 53 so as to face the dividing wall 116.

Note that a size of the substrate 53 and positions where the image capturing device 51 and the illumination device 52 are attached to the substrate 53 are not particularly limited.

The image capturing device 51 is, for example, a small camera having a solid state image sensor with a pixel count of about 2 million pixels or greater, a lens, and the like.

The image capturing device 51 is configured to detect curvature and the like of the nail T of the print finger U1 by movement of the head movement portion 49 so as to image the nail T from at least two different positions or angles. As a result, at least two of the nail images are acquired and a nail information detection portion 812 (described hereinafter) detects the nail information such as an outline of the nail T (shape of the nail T), curved shape of the nail T (curvature of the nail T), vertical position of the nail T, and the like on the basis of the nail images.

Note that in the present embodiment, due to the fact that the image capturing device 51 can be moved to above the nail T of the print finger U1, which has been inserted in the finger receiving portion 31, by the head movement portion 49 and imaging can be performed, it is sufficient that an imageable range of the image capturing device 51 cover roughly the area of one nail T.

The illumination device 52 is, for example, a white LED or similar illuminating lamp.

In the present embodiment, two of the illumination devices 52 are disposed on a front side and a back side of the image capturing device 51 so as to sandwich the image capturing device 51. Each of the illumination devices 52 radiates light downward and illuminates an imaging area below the image capturing device 51.

Note that the disposal and number of the illumination devices 52 provided is not limited to the illustrated examples.

The imaging unit 50 is connected to an imaging control portion 811 of the control device 80 (described hereinafter, see FIG. 4), and is configured to be controlled by the imaging control portion 811.

Note that image data of the image imaged by the imaging unit 50 are stored in a nail image memory region 821 of the memory unit 82 (described hereinafter).

The control device 80 is, for example, arranged on a substrate 13 or the like disposed in the upper frame 12.

Figure 4:
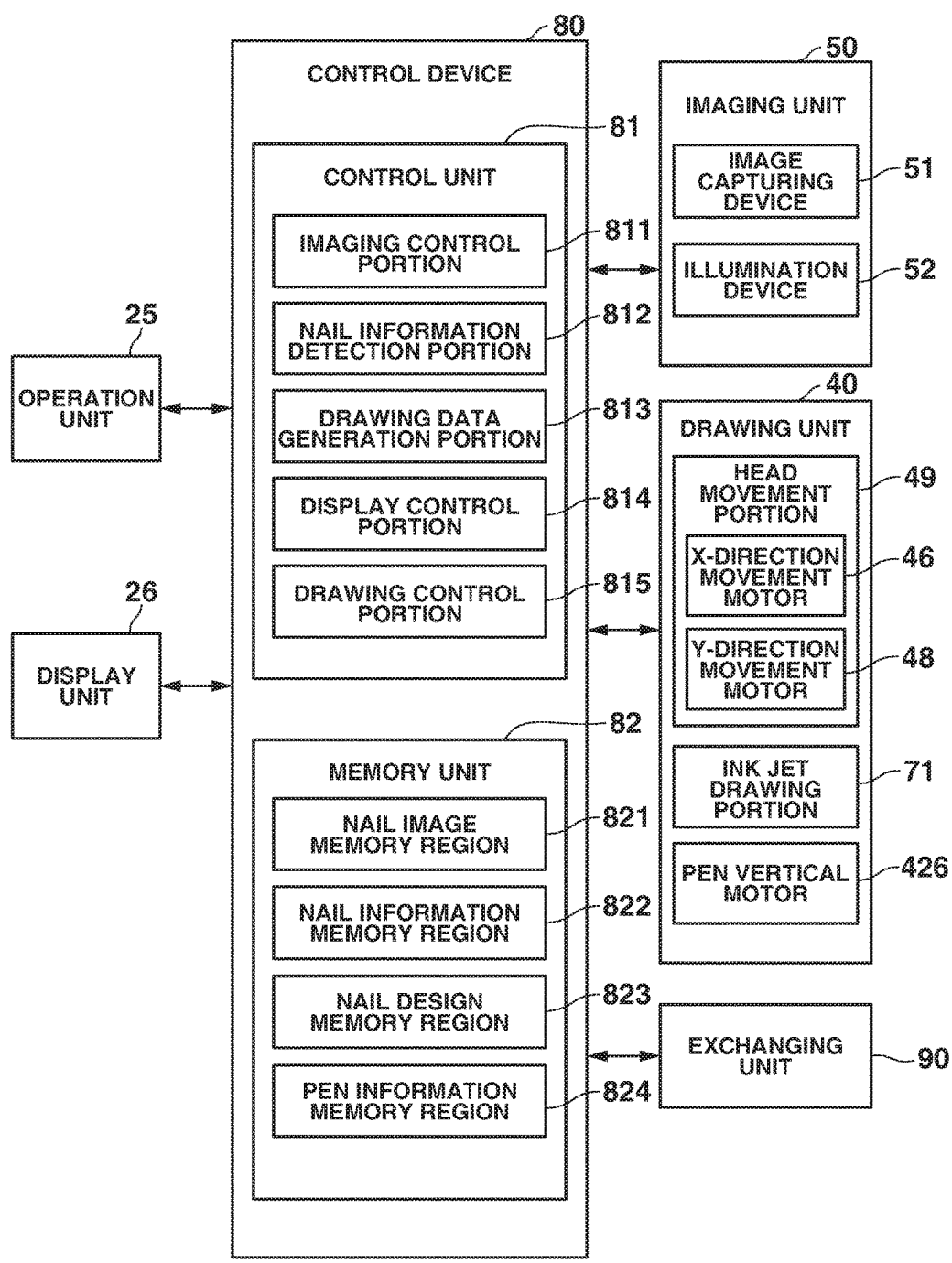
FIG. 4 is a main constituent block diagram showing a control configuration of the drawing apparatus according to the embodiment of the present invention.

FIG. 4 is a main constituent block diagram showing the control configuration according to the present embodiment.

As illustrated in FIG. 4, the control device 80 is a computer provided with a control unit 81 constituted by a central processing unit (CPU) (not illustrated in the drawings), and a memory unit 82 constituted by a read only memory (ROM), a random access memory (RAM), or the like (neither illustrated in the drawings).

Various programs to operate the nail printing apparatus 1, various data, and the like are stored in the memory unit 82.

Specifically, various programs are stored in the ROM of the memory unit 82 such as a nail information detection program for detecting the nail information such as the shape of the nail T and the outline of the nail T from the nail image; a drawing data generation program for generating drawing data; a drawing program for performing drawing processing; and the like. These programs are executed by the control unit 80 and, thereby the individual constituents of the nail printing apparatus 1 are integrally controlled.

In the present embodiment, the memory unit 82 is provided with the nail image memory region 821 where the nail image of the nail T of the print finger U1 of a user acquired by the imaging unit 50 is stored, a nail information memory region 822 where the nail information detected by the nail information detection portion 812 (the outline of the nail T, inclination angle of the nail T, and the like) is stored, a nail design memory region 823 where image data of a nail design to be drawn on the nail T is stored, and a pen information memory region 824 where information related to the pen 41 is stored.

When viewed from a function perspective, the control unit 81 is provided with the imaging control portion 811, the nail information detection portion 812, a drawing data generation portion 813, a display control portion 814, a drawing control portion 815, and the like.

Functions of the imaging control portion 811, the nail information detection portion 812, the drawing data generation portion 813, the display control portion 814, the drawing control portion 815, and the like are realized by cooperation of the CPU of the control unit 81 and the programs stored in the ROM of the memory unit 82.

The imaging control portion 811 is configured to cause the image capturing device 51 to capture an image of a finger (hereinafter referred to as "nail image"), including images of the nail T of the print finger U1 inserted into the finger receiving portion 31, by controlling the image capturing device 51 and the illumination device 52 of the imaging unit 50.

In the present embodiment, the image capturing device 51 is moved by the drawing control portion 815 that controls the head movement portion 49, and the imaging control portion 811 causes the image capturing device 51 to acquire at least two nail images from two different positions or angles (e.g. directly above the nail T and diagonally above the nail T, or the like).

The image data of the nail image acquired by the imaging unit 50 are stored in the nail image memory region 821 of the memory unit 82.

The nail information detection portion 812 is configured to detect the nail information of the nail T of the print finger U1 on the basis of the image of the nail T of the print finger U1 inserted into the finger receiving portion 31, the image being imaged by the image capturing device 51.

Here "nail information" refers to, for example, the outline of the nail T (nail shape, XY coordinates of the horizontal position of the nail T, and the like), the height of the nail T (position in the vertical direction of the nail T, hereinafter referred to as the "vertical position of the nail T" or simply the "position of the nail T"), and the inclination angle with respect to the XY plane of the surface of the nail T (the inclination angle of the nail T or nail curvature).

A length in a width direction (lateral direction) W of the nail T and a length in an extending direction (longitudinal direction) L of the nail T are acquired from the XY coordinates or the like of the horizontal position of the nail T.

The nail information detection portion 812 can accurately detect the curvature and the like of the nail T by performing the detection of the nail information using a plurality of nail images imaged from different positions or angles (e.g. directly above the nail T, diagonally above the nail T, and the like).

The drawing data generation portion 813 generates data for the drawing to be performed by the drawing head 43 on the nail T of the print finger U1 on the basis of the nail information detected by the nail information detection portion 812.

Figure 5A:
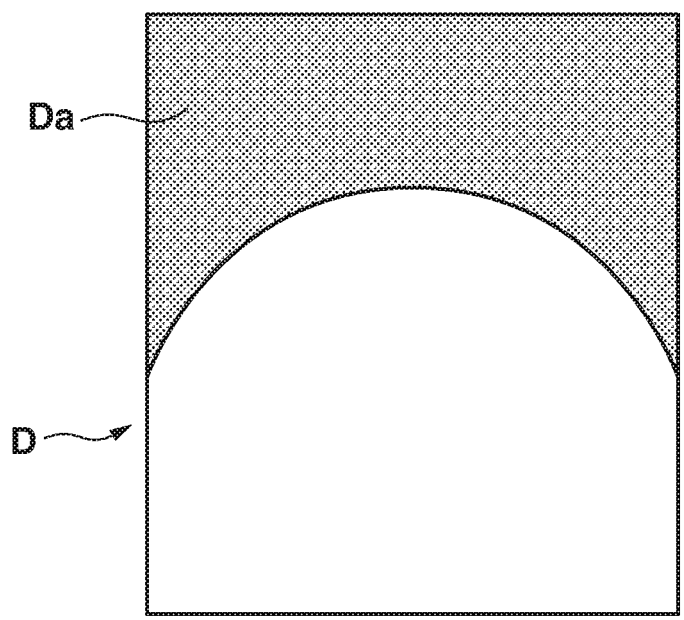
FIG. 5A is a drawing illustrating an image of image data of a nail design.
Figure 5B:
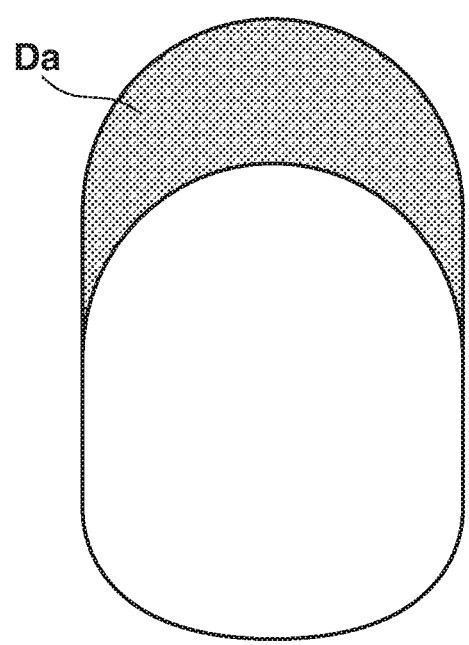
FIG. 5B is a conceptual drawing illustrating a state where the nail design depicted in FIG. 5A is fitted to a nail.

FIG. 5A is a drawing illustrating an image of image data D of a nail design. FIG. 5B is a conceptual drawing illustrating a state where the nail design depicted in FIG. 5A is fitted to the nail T.

For example, in a case such as that illustrated in FIG. 5A where the image data D of the nail design has a fill area Da at a portion corresponding to a tip side of the nail T, the drawing data generation portion 813 performs calibration processing, such as enlarging, reducing, and cropping of the image data of the nail design, based on the shape of the nail T and the like detected by the nail information detection portion 812, and generates drawing data such as that illustrated in FIG. 5B for applying the drawing on the nail T.

The drawing data generation portion 813 calibrates the image data of the nail design to the shape of the nail T corresponding to the nail information detected by the nail information detection portion 812, and performs appropriate curve correction and the like.

As a result, drawing data for the nail design to be drawn by the pen 41 or the ink jet drawing portion 71 is generated.

The display control portion 814 is configured to cause the display unit 26 to display various display screens by controlling the display unit 26. In the present embodiment, examples of the various display screens the display control portion 814 is configured to display on the display unit 26 include nail design selection screens and thumbnail images for confirming designs, nail images acquired by imaging the print finger U1, various command screens or selection screens, operation screens, and the like.

The drawing control portion 815 is configured to output control signals to the drawing unit 40 on the basis of the drawing data generated by the drawing data generation portion 813, and control the X-direction movement motor 46, the Y-direction movement motor 48, and the pen vertical motor 426 of the drawing unit 40, the ink jet drawing portion 71, and the like so as to apply a drawing corresponding to the drawing data on the nail T.

Specifically, when the pen 41 is not drawing, the drawing control portion 815 controls the pen vertical motor 426 to maintain a state where the retaining protrusion 424 is not pressed down by the plate spring 429; and when the pen 41 is drawing, the drawing control portion 815 causes the pen vertical motor 426 to operate and controls the operation of the pen vertical motor 426 so that the retaining protrusion 424 is pressed down by the plate spring 429 and the tip side (the pen tip 413) of the pen 41 comes into contact with the surface of the nail T.

Note that at locations where the height of the nail T changes greatly and cannot be handled by the flexible deformation (elastic deformation) of the plate spring 429 alone, the drawing control portion 815 preferably causes the number of steps of the pen vertical motor 426 to be increased or decreased, thus adjusting the pen pressure of the pen 41 so that the pen pressure becomes roughly constant.

In the present embodiment, the drawing control portion 815 is configured to cause repeated application of a certain amount of drawing on the nail T in cases of applying drawing with the pen 41.

Figure 6A:
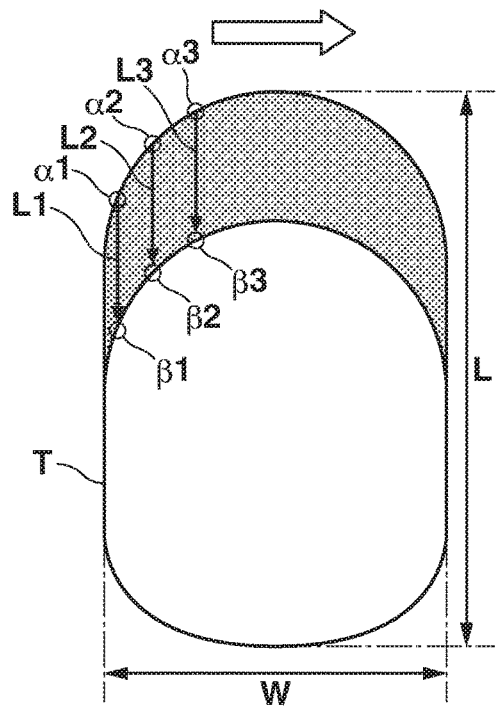
FIG. 6A is an explanatory drawing illustrating an order of drawing processing according to the embodiment of the present invention.

FIG. 6A is an explanatory drawing illustrating an order of drawing processing with the pen 41 according to the present embodiment.

Note that in FIG. 6A, a drawing direction in the present embodiment is indicated by the white arrow.

As illustrated in FIG. 6A, for example, in the drawing in the fill area Da of the tip portion of the nail T, a left-side edge of the nail T in the width direction W is an initial drawing start position α1.

Here, the drawing control portion 815 controls the pen vertical motor 426 of the lifting mechanism to lower the pen 41 and the pen tip 413 to come into contact with the nail T.

In this state, the drawing control portion 815 controls the head movement portion 49 to move the pen 41 along the extending direction L of the nail T from the drawing start position α1 to a drawing end position β1 and draw a line L1.

Upon completion of the drawing of the line L1, the drawing control portion 815 controls the pen vertical motor 426 of the lifting mechanism to temporarily lift the pen to a height where the pen 41 is not in contact with the nail T. Then, the drawing control portion 815 controls the head movement portion 49 to move the pen 41, in a right-diagonal direction in the width direction W and the extending direction L of the nail T, to a drawing start position α2 of a subsequent line.

The drawing control portion 815 again controls the pen vertical motor 426 of the lifting mechanism and the head movement portion 49 to lower and move the pen 41 from the drawing start position α2 to a drawing end position β2 and draw a line L2.

Upon completion of the drawing of the line L2, the drawing control portion 815 controls the pen vertical motor 426 of the lifting mechanism and the head movement portion 49 to temporarily lift and move the pen 41 to a drawing start position α3 of a subsequent line.

Thereafter, in the same manner, the drawing control portion 815 again controls the pen vertical motor 426 of the lifting mechanism and the head movement portion 49 to lower and move the pen 41 from the drawing start position α3 to a drawing end position β3 and draw a line L3.

Thus, the drawing control portion 815 is configured to cause lines to be drawn one at a time along the extending direction L of the nail T while lifting and lowering the pen 41, thus causing drawing to be performed from a first edge of the nail T in the width direction W to a second edge.

Furthermore, in the present embodiment, the drawing control portion 815 and the imaging control portion 811 are configured to image a drawing state of the lines while the drawing with the pen 41 on the nail T is being performed and specifically each time the drawing of one line is completed, and inspect whether or not that line is drawn correctly on the basis of a result of the imaging.

As illustrated in FIG. 6A, when the pen 41 is positioned at the drawing start position α1, the imaging control portion 811 controls the imaging unit 50 and causes the image capturing device 51 to image the nail T before drawing, while illuminating the nail using the illumination device 52, and, thereby, acquire an initial image G0.

Thereafter, when the pen 41 reaches the drawing end position β1, the imaging control portion 811 controls the imaging unit 50 and causes the image capturing device 51 to image the nail T including the line L1, while illuminating the nail T using the illumination device 52, and, thereby, acquire a line image G1.

Then, the drawing control portion 815 compares the initial image G0 and the line image G1 and inspects whether or not the line L1 is correctly drawn.

Thereafter, when the pen 41 reaches the drawing end position β2, the imaging control portion 811 controls the imaging unit 50 to image the nail T including the lines L1 and L2 and, thereby, acquire a line image G2.

Then, the drawing control portion 815 compares the line image G1 and the line image G2 and inspects whether or not the line L2 is correctly drawn.

Thereafter, in the same manner, when the pen 41 reaches the drawing end position β3, the imaging control portion 811 controls the imaging unit 50 to image the nail T including the lines L2 and L3 and, thereby, acquire a line image G3.

Then, the drawing control portion 815 compares the line image G2 and the line image G3 and inspects whether or not the line L3 is correctly drawn.

Thus, the drawing control portion 815 and the imaging control portion 811 are configured to image a drawing state of the lines each time the drawing of one line is completed and inspect whether or not that line is drawn correctly by comparing images before and after the drawing of that line.

Next, a drawing method by the nail printing apparatus 1 according to the present embodiment is described while referencing FIGS. 6A to 6D and FIG. 7.

In cases where applying drawing using the nail printing apparatus 1, a user first operates a power switch to turn on the control device 80.

Figure 7:
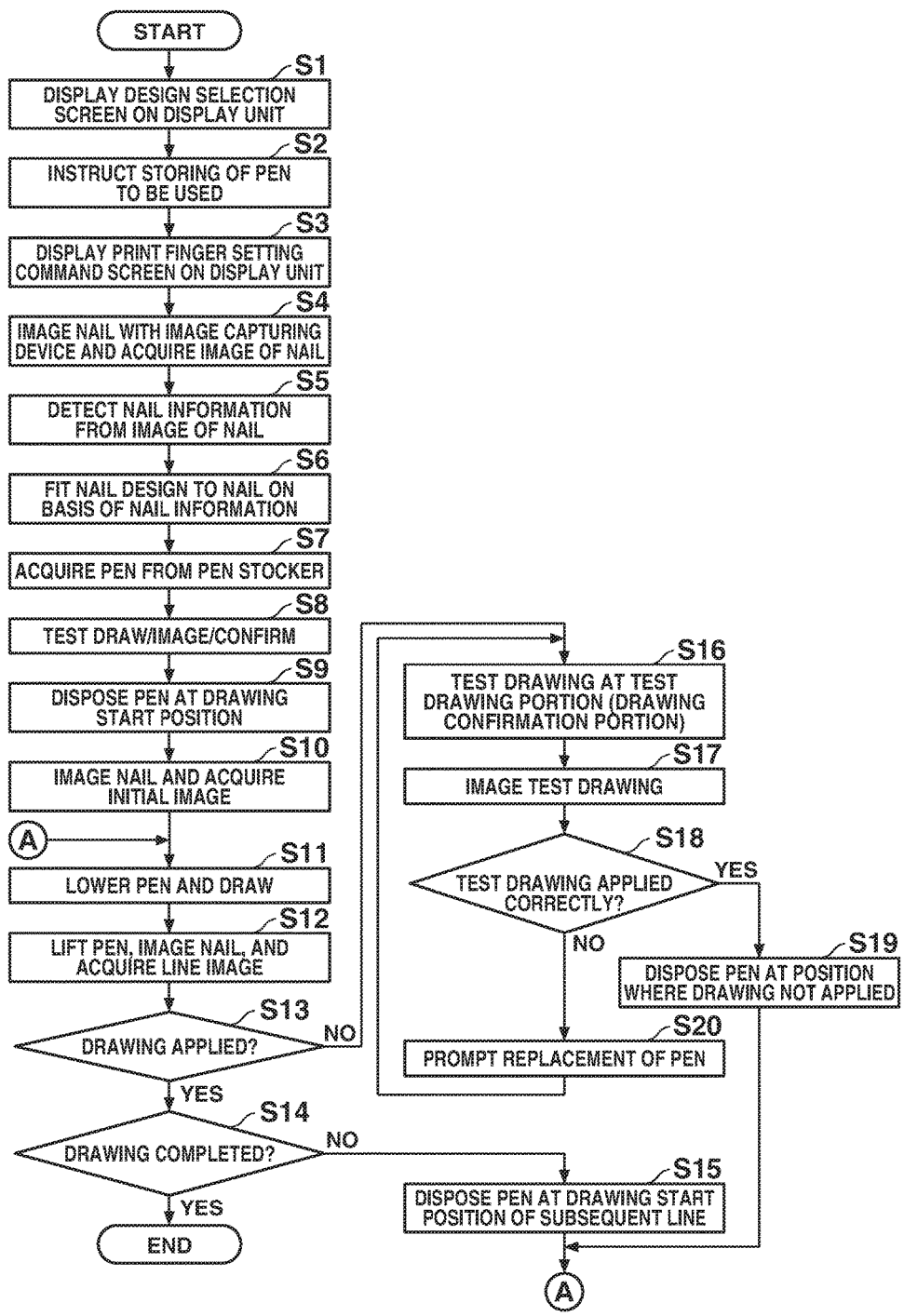
FIG. 7 is a flowchart showing drawing processing according to a first embodiment of the present invention.

As shown in FIG. 7, the display control portion 814 displays a design selection screen on the display unit 26 (step S1). The user operates operation buttons 251 or the like on the operation unit 25 and selects a desired nail design from among a plurality of nail designs displayed on the design selection screen. As a result, a selection command signal is output from the operation unit 25 and the nail design to be drawn on the nail T is selected.

Thereafter, the display control portion 814 causes the display unit 26 to display a command screen prompting that the pen 41 required to draw the nail design be stored in the pen stocker 64 (step S2). The user follows the commands displayed on the display screen and stores the pen 41 in the pen stocker 64.

Thereafter, the display control portion 814 causes the display unit 26 to display a command screen prompting that the print finger U1 be set in the finger receiving portion 31 (step S3).

The user operates a draw switch (not illustrated in the drawings) of the operation unit 25 after inserting the print finger U1 into the finger receiving portion 31, inserting the non-print fingers U2 into the finger clearing portion 32, and securing the print finger U1 to the finger receiving portion 31.

Upon a command being input from the draw switch and prior to beginning the drawing operation, the imaging control portion 811 first controls the imaging unit 50 and causes the image capturing device 51 to image the print finger U1 while illuminating the print finger U1 using the illumination device 52.

As a result, the imaging control portion 811 acquires at least two images of the nail T (nail images) of the print finger U1 that has been inserted into the finger receiving portion 31 (step S4).

Thereafter, the nail information detection portion 812 detects the nail information such as the outline (nail shape) of the nail T, the inclination angle (nail curvature) of the nail T, and the like on the basis of the nail images (step S5).

Upon detection of the outline (nail shape) of the nail T and the inclination angle (nail curvature) of the nail T by the nail information detection portion 812, the drawing data generation portion 813 performs calibration processing (fitting) of the image data of the nail design on the nail T, based on the nail information (step S6).

The drawing data generation portion 813 performs curvature correction on the image data of the nail design, based on the nail information. As a result, the drawing data is generated.

Thereafter, the drawing control portion 815 controls the head movement portion 49 and the exchanging unit 90 to move the drawing head 43 near the pen stocker 64 of the home area 60 and move the pen 41 of the pen stocker 64 to the pen holder 42 of the drawing head 43 (step S7).

Thereafter, the drawing control portion 815 controls the head movement portion 49 and the pen vertical motor 426 of the lifting mechanism to move the drawing head 43 to the test drawing portion (the drawing testing portion) 61. Then, test drawing by the pen 41 on the drawing media 61a is performed at the test drawing portion 61, and the imaging control portion 811 controls the imaging unit 50 to image the region of the drawing media 61a where the test drawing has been performed by the pen 41 using the image capturing device 51.

Then, the drawing control portion 815 determines whether or not the test drawing by the pen 41 has been performed correctly on the basis of the imaging results. This processing is repeated until the test drawing by the pen 41 is performed correctly (step S8).

Upon the test drawing by the pen 41 being performed correctly, the drawing control portion 815 outputs the drawing data to the drawing unit 40 and controls the head movement portion 49 to move the drawing head 43 and dispose the pen 41 above a drawing start position of the selected nail design, that is, above the surface of the nail T (step S9).

Thereafter, the imaging control portion 811 controls the imaging unit 50, causing the image capturing device 51 to image the nail T from above the drawing start position and acquire an initial image (step S10).

For example, in a case where the drawing object is the fill area Da of the nail T illustrated in FIG. 6A, the pen 41 is moved to above the drawing start position α1, the nail T is imaged from above the drawing start position α1, and the initial image G0 is acquired.

Thereafter, the drawing control portion 815 controls the pen vertical motor 426 of the lifting mechanism to lower and bring the pen 41 into contact with the nail T and draw a line from the drawing start position (step S11).

For example, in the example illustrated in FIG. 6A, the pen 41 is lowered at the drawing start position α1 and moved along the extending direction L of the nail T so as to draw the line L1.

Thereafter, upon the pen 41 reaching the drawing end position, the drawing control portion 815 controls the pen vertical motor 426 of the lifting mechanism to temporarily lift the pen 41 to a height where the pen is not in contact with the nail T; and the imaging control portion 811 controls the imaging unit 50, causing the image capturing device 51 to image the nail T from above the drawing end position and acquire an image (step S12).

For example, in the example illustrated in FIG. 6A, the pen 41 is raised at the drawing end position β1, the nail is imaged from above the drawing end position β1, and the image G1 is acquired.

Thereafter, the drawing control portion 815 compares the initial image and the line image captured before and after the drawing and determines whether or not the line planned to be drawn is correctly drawn on the basis of the drawing data.

For example, in the example illustrated in FIG. 6A, in a case where a line L1 is planned to be drawn from the drawing data between the drawing start position α1 and the drawing end position β1, the initial image G0 at the drawing start position α1 and the line image G1 at the drawing end position β1 are compared and it is determined whether or not the line L1 is drawn correctly. That is, the initial image G0 and the line image G1 are compared and, in cases where the line L1 is, overall, drawn between the drawing start position α1 and the drawing end position β1, the line L1 is determined to be drawn correctly. On the other hand, in cases where, in the line image G1, the line L1 is partially or entirely not drawn between the drawing start position α1 and the drawing end position β1, the line L1 is determined to be not drawn correctly.

In cases where the line is determined to be drawn correctly (step S13; YES), the drawing control portion 815 determines whether or not a set number of lines have been drawn and drawing on the entirety of the nail T is completed (step S14).

In cases where the drawing on the entirety of the nail T is completed (step S14; YES), the drawing control portion 815 ends the drawing processing for the nail T.

In cases where the drawing on the entirety of the nail T is not completed (step S14; NO), the drawing control portion 815 controls the head movement portion 49 to move the drawing head 43 along the width direction W and the extending direction L of the nail T and dispose the pen 41 above the drawing start position of a subsequent line (step S15).

For example, in the example illustrated in FIG. 6A, the pen 41 is moved from the drawing end position β1 to the drawing start position α2 and disposed above the drawing start position α2.

Note that the amount the drawing head 43 is caused to move in the width direction W of the nail T may be appropriately adjusted in accordance with the thickness of the pen tip 413 and the like, and the drawing control portion 815 determines the amount of movement in the width direction W of the nail T on the basis of the information related to the pen 41 that is stored in the pen information memory region 824.

Thereafter, the drawing control portion 815 and the imaging control portion 811 repeatedly execute the processing of steps S11 to S15.

For example, in the example illustrated in FIG. 6A, a line L2 is caused to be drawn from a drawing start position α2 to a drawing end position β2, the nail T is caused to be imaged at the drawing end position β2 and a line image G2 is acquired, the initial image G1 at the drawing end position β1 and the line image G2 at the drawing end position β2 are compared, and it is determined whether or not the line L2 is drawn correctly.

Thereafter, in the same manner, a line L3 is caused to be drawn from a drawing start position α3 to a drawing end position β3, the nail T is caused to be imaged at the drawing end position β3 and a line image G3 is acquired, the line image G2 at the drawing end position β2 and the line image G3 at the drawing end position β3 are compared, and it is determined whether or not the line L3 is drawn correctly.

Then, the drawing control portion 815 ends the drawing processing for the nail T at the point where the drawing on the entirety of the nail T is completed (step S14; YES).

Here, regarding the drawing control portion 815 and the imaging control portion 811, during the repeating of steps S11 to S15 and the application of the drawing by the pen 41, the imaging control portion 811 causes the image capturing device 51 to image the drawing state of the nail T and the drawing control portion 815 determines whether or not the drawing by the pen 41 is correctly performed on the basis of the imaging results (step S13).

In cases where determination is made that the drawing is not performed correctly (step S13; NO), the drawing control portion 815 interrupts the drawing by the pen 41. Then, the pen 41 is caused to draw on the drawing media 61a in the test drawing portion (the drawing testing portion) 61 (step S16).

That is, in the repetitions of the processing of steps S11 to S15, in cases where the lines are not drawn correctly (step S13; NO), the drawing control portion 815 controls the head movement portion 49 and the pen vertical motor 426 of the lifting mechanism to interrupt the drawing by the pen 41, move the drawing head 43 to the test drawing portion 61, and apply test drawing (drawing on the drawing media 61a) by the pen 41 on the drawing media 61a at the test drawing portion 61 (step S16).

Thereafter, the imaging control portion 811 causes the image capturing device 51 to image the results of the drawing on the drawing media 61a by the pen 41 at the test drawing portion 61 (step S17).

The drawing control portion 815 determines whether or not the drawing on the drawing media 61a by the pen 41 is performed correctly on the basis of the imaging results (step S18). In cases where the drawing control portion 815 determines the drawing to be performed correctly, the drawing control portion 815 resumes the drawing on the nail T by the pen 41 (transition from step S19 to S11).

That is, the imaging control portion 811 controls the imaging unit 50 to cause the image capturing device 51 to image the region where the test drawing by the pen 41 on the drawing media 61a has been performed (step S17), and the drawing control portion 815 determines whether or not the test drawing by the pen 41 is performed correctly on the basis of the imaging results (step S18).

In cases where the test drawing by the pen 41 is performed correctly (step S18; YES), the drawing control portion 815 controls the head movement portion 49 to move the drawing head 43 to the position where the drawing has not been performed and dispose the pen 41 above the position where the drawing has not been performed (step S19), and executes step S11.

Figure 6B:
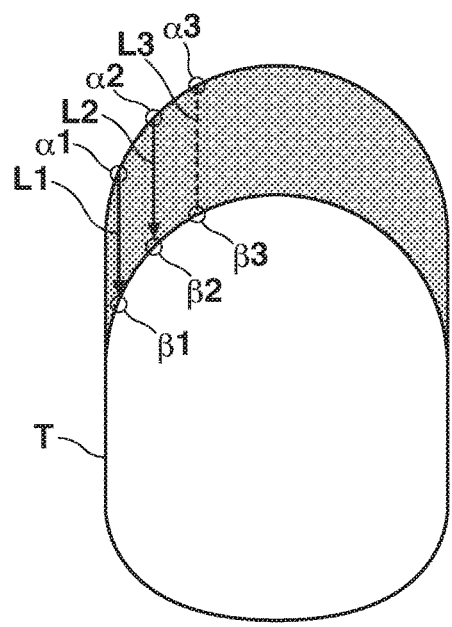
FIGS. 6B to 6D are explanatory drawings illustrating examples of defects in the drawing.
Figure 6C:
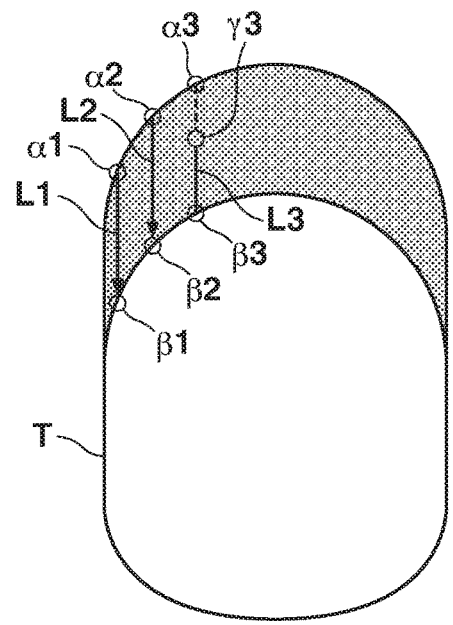

For example, in cases where the line L3 is faded or the like and is not drawn correctly from the drawing start position α3 to the drawing end position β3 as illustrated in FIG. 6B, or, in cases where the line L3 is faded or the like and is not drawn correctly from the drawing start position α3 to a drawing intermediate position γ3 as illustrated in FIG. 6C, the pen 41, after the test drawing, is caused to be disposed above the drawing start position α3 and draw the line L3 from the drawing start position α3.

Figure 6D:
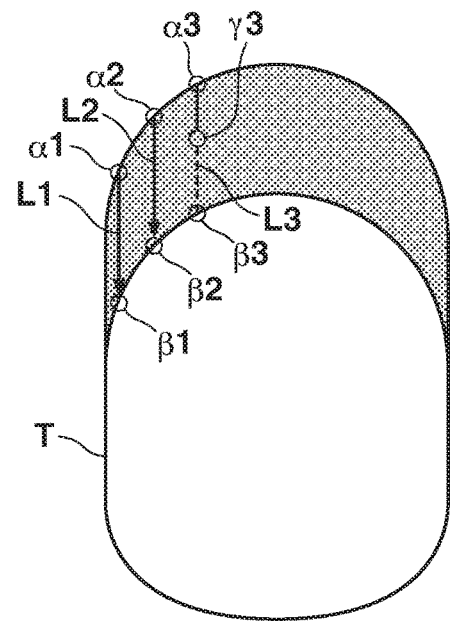

As illustrated in FIG. 6D, in cases where the line L3 has been drawn from the drawing start position α3 to the drawing intermediate position γ3 but the line L3 has not been drawn from the drawing intermediate position γ3 to the drawing end position β3, the pen 41, after the test drawing, is caused to be disposed above the drawing intermediate position γ3 and draw the line L3 from the drawing intermediate position γ3.

In cases where the test drawing by the pen 41 is not performed correctly (step S18; NO), the drawing control portion 815 controls the head movement portion 49 to move the drawing head 43 near the pen stocker 64 of the home area 60, and controls the exchanging unit 90 to move the pen 41 in the pen holder 42 to the pen stocker 64.

At the same time, the display control portion 814 causes the display unit 26 to display a command screen prompting that the pen 41 be replaced with a new pen 41 (step S20).

That is, in step S20, the pen 41 in the pen holder 42 is returned to the pen stocker 64 and the user is prompted to replace the pen 41.

Thereafter, the user follows the commands displayed on the display screen and, upon storing a new pen 41 in the pen stocker 64, the drawing control portion 815 and the imaging control portion 811 repeatedly execute the processing of steps S16 to S19.

Note that in cases where the test drawing by the pen 41 is not performed correctly in a single attempt (step S18; NO), the processing of steps S16 to S18 may be repeatedly executed and the test drawing by the pen 41 may be attempted a second or further times. Thereafter, the processing of step S19 and step S20 may be executed.

Also, in cases where the pen 41 in the pen holder 42 is replaced with a new pen 41, when the test drawing by the new pen 41 is not performed correctly in a single attempt (step S18; NO), the processing of steps S16 to S18 may be repeatedly executed and the test drawing by the new pen 41 may be attempted a second or further times.

According to the present embodiment described above, each time the drawing of one line is completed, that line is imaged, the initial image and the line image before and after the drawing or the line images are compared, and it is determined whether or not the line has been drawn correctly. Moreover, when the line is not drawn correctly, test drawing by the pen 41 (drawing in the drawing media 61a) is performed and the drawing on the nail T is resumed depending on the results of the test drawing.

In this case, when one line of the drawing is defective as illustrated in FIG. 6B, or when the drawing is defective from the start of one line to an intermediate point as illustrated in FIG. 6C, the drawing of that line is resumed from the drawing start position. When the drawing is defective from an intermediate point of one line as illustrated in FIG. 6D, the drawing of that line is resumed from the drawing intermediate position.

Therefore, the advancing of the drawing processing in a state where the drawing has not been performed on the desired region is prevented and the advancing of the drawing processing in a state where the drawing, in part, has not been performed is prevented.

As described above, a finish exactly the same as the desired design can be realized, failures in the application of the nail designs can be prevented, ink jet printing can be applied on a base layer, and occurrences of declines in design durability can be prevented.

Second Embodiment

A second embodiment of the nail printing apparatus (drawing apparatus) and drawing method for the nail printing apparatus (drawing apparatus) is described below while referring to FIGS. 2B and 8.

This embodiment mainly differs from the first embodiment in that a spare pen (replacement drawing tool) is prepared in advance and used. Points that particularly differ from the first embodiment are described below.

Figure 2B:
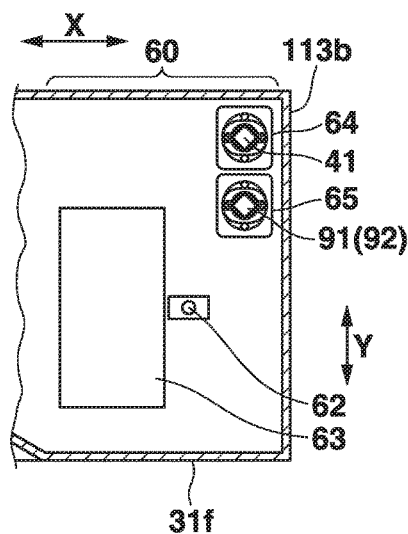
FIGS. 2B and 2C are drawings illustrating modification examples of FIG. 2A.

As illustrated in FIG. 2B, two pen stockers 64 and 65 are provided in the home area 60.

The pen 41 is stored in the first pen stocker 64 and a spare pen (replacement drawing tool) 91 is stored in the second pen stocker 65.

The spare pen 91 is a pen that becomes a replacement for the pen 41 and is of the same type as the pen 41.

The two pen stockers 64 and 65 are identical members and exhibit a cylindrical shape. The spare pen 91 is inserted from above and is stored in the pen stocker 65 in the same manner as the pen 41.

The spare pen 91 can be exchanged between the pen stocker 65 and the pen holder 42 by the exchanging unit 90 while the drawing head 43 is standing by at the home area 60.

Figure 8:
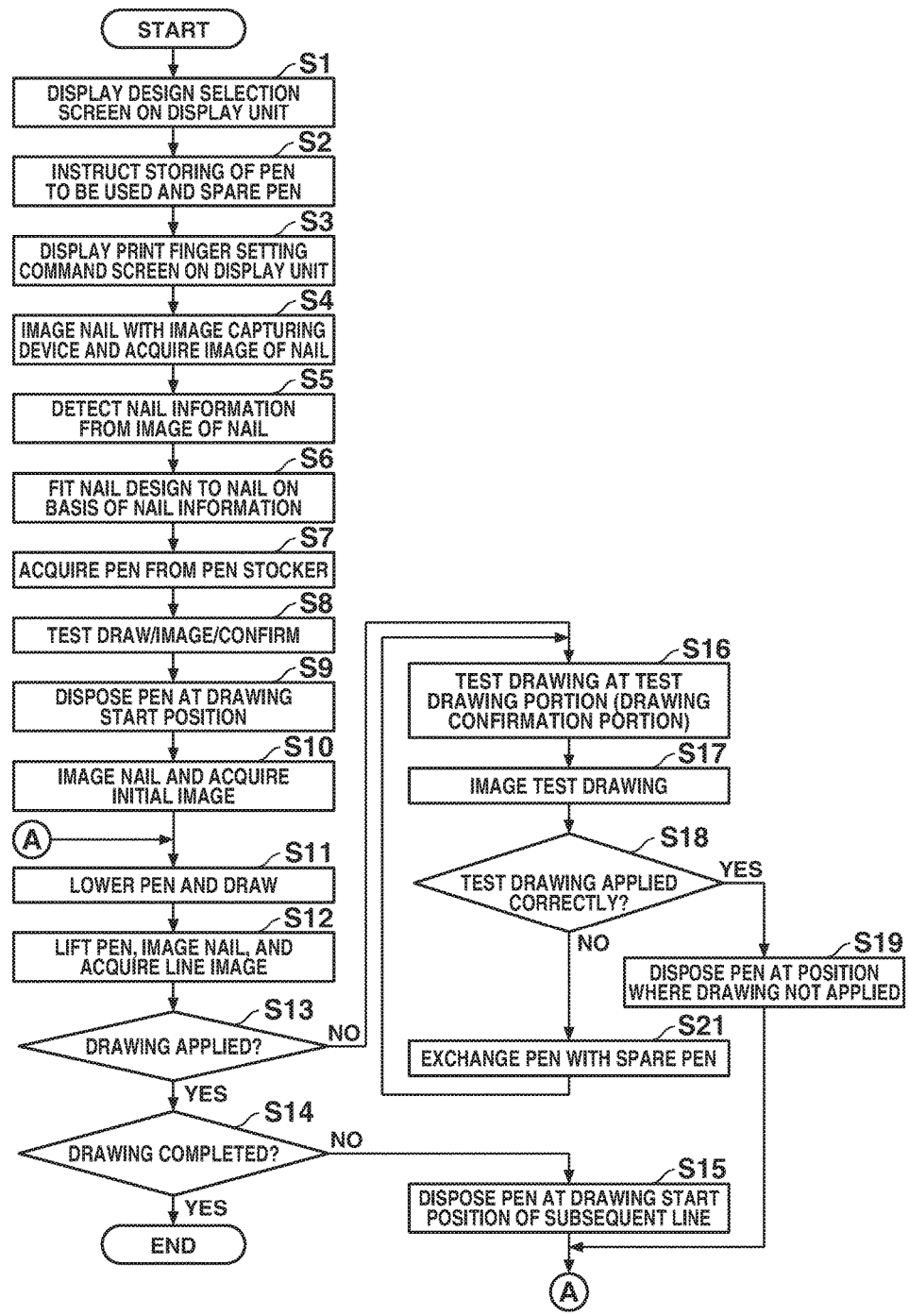
FIG. 8 is a flowchart showing drawing processing according to a second embodiment of the present invention.

Next, a drawing method by the nail printing apparatus 1 according to the present embodiment is described while referencing FIG. 8.

Note that steps S1 to S19 in FIG. 8 are the same as steps S1 to S19 in FIG. 7 of the first embodiment, and description thereof is omitted.

However, in step S2 in FIG. 8, the display control portion 814 causes the display unit 26 to display a command screen prompting that the pen 41 and the spare pen 91 required to draw the nail design be stored in the pen stockers 64 and 65.

The user follows the commands displayed on the display screen and stores the pen 41 and the spare pen 91 in the pen stockers 64 and 65.

In steps S17 and S18 in FIG. 8, the imaging control portion 811 causes the image capturing device 51 to image the results of the drawing on the drawing media 61a by the pen 41 in the test drawing portion (drawing testing portion) 61 (step S17).

Then, the drawing control portion 815 determines whether or not the drawing on the drawing media 61a by the pen 41 is performed correctly on the basis of the imaging results (step S18). Then, in cases where the drawing control portion 815 determines that the drawing is not performed correctly (step S18; NO), the drawing control portion 815 exchanges the pen 41 in the pen holder 42 with the spare pen 91 in the pen stocker 65 (step S21) using the exchanging unit 90.

That is, in step S18, in cases where the test drawing (the drawing on the drawing media 61a) by the pen 41 is not performed correctly (step S18; NO), the drawing control portion 815 controls the head movement portion 49 to move the drawing head 43 near the pen stockers 64 and 65 of the home area 60.

Here, the drawing control portion 815 controls the exchanging unit 90 to move the pen 41 in the pen holder 42 to the pen stocker 64 and move the spare pen 91 in the pen stocker 65 to the pen holder 42 (step S21).

That is, in step S21, the pen 41 in the pen holder 42 is exchanged with the spare pen 91.

Thereafter, the drawing control portion 815 and the imaging control portion 811 repeatedly execute the processing of steps S16 to S18.

Specifically, when there are defects in the drawing by the pen 41 illustrated in FIGS. 6B and 6C, the pen 41 in the pen holder 42 is exchanged with the spare pen 91 and, thereafter, the spare pen 91 is caused to be disposed above the drawing start position α3 and draw the line L3 from the drawing start position α3. When there are defects in the drawing by the pen 41 illustrated in FIG. 6D, the spare pen 91 is caused to be disposed above the drawing intermediate position γ3 and draw the line L3 from the drawing intermediate position γ3.

Note that in cases where the test drawing by the pen 41 is not performed correctly in a single attempt (step S18; NO), the processing of steps S16 to S18 may be repeatedly executed and the test drawing by the pen 41 may be attempted a second or further times. Thereafter, the processing of step S19 and step S21 may be executed.

Also, in cases where the pen 41 in the pen holder 42 is exchanged with the spare pen 91, when the test drawing by the spare pen 91 is not performed correctly in a single attempt (step S18; NO), the processing of steps S16 to S18 may be repeatedly executed and the test drawing by the spare pen 91 may be attempted a second or further times.

According to the present embodiment, in cases where the test drawing by the pen 41 is not performed correctly, the pen 41 in the drawing head 43 is exchanged with the spare pen 91 and the drawing on the nail T is resumed.

In this case as well, when one line of the drawing is defective as illustrated in FIG. 6B, or when the drawing is defective from the start of one line to an intermediate point as illustrated in FIG. 6C, the drawing of that line is resumed from the drawing start position. When the drawing is defective from an intermediate point of one line as illustrated in FIG. 6D, the drawing of that line is resumed from the drawing intermediate position.

As a result, even if ink runs out in the pen 41, the drawing on the nail T can be resumed and failures in the application of the nail design and the occurrence of declines in durability of the design can be reliably prevented.

Third Embodiment

A third embodiment of the nail printing apparatus (drawing apparatus) and drawing method for the nail printing apparatus (drawing apparatus) is described below while referring to FIGS. 2B and 9.

This embodiment mainly differs from the first embodiment in that a second pen (other drawing tool) is prepared in advance and used. Points that particularly differ from the first embodiment are described below.

As illustrated in FIG. 2B, two pen stockers 64 and 65 are provided in the home area 60.

The pen 41 is stored in the first pen stocker 64 and a second pen (other drawing tool) 92 is stored in the second pen stocker 65.

The second pen 92 is a pen of a different type than the pen 41 and is used in place of the pen 41.

In the present embodiment, the pen 41 is used to draw a white base, and the second pen 92 is used, for example, in a drawing capable of covering up the white base.

For example, a light pink ink may be stored in the pen shaft portion 411 of the second pen 92. The two pen stockers 64 and 65 are identical members and exhibit a cylindrical shape. The second pen 92 is inserted from above and is stored in the pen stocker 65 in the same manner as the pen 41.

Information related to the second pen 92 such as the shape and thickness of the second pen 92 stored in the pen stocker 65, the type of ink stored, and the like is also stored in advance in the pen information memory region 824 (see FIG. 4) of the memory unit 82.

Figure 9:
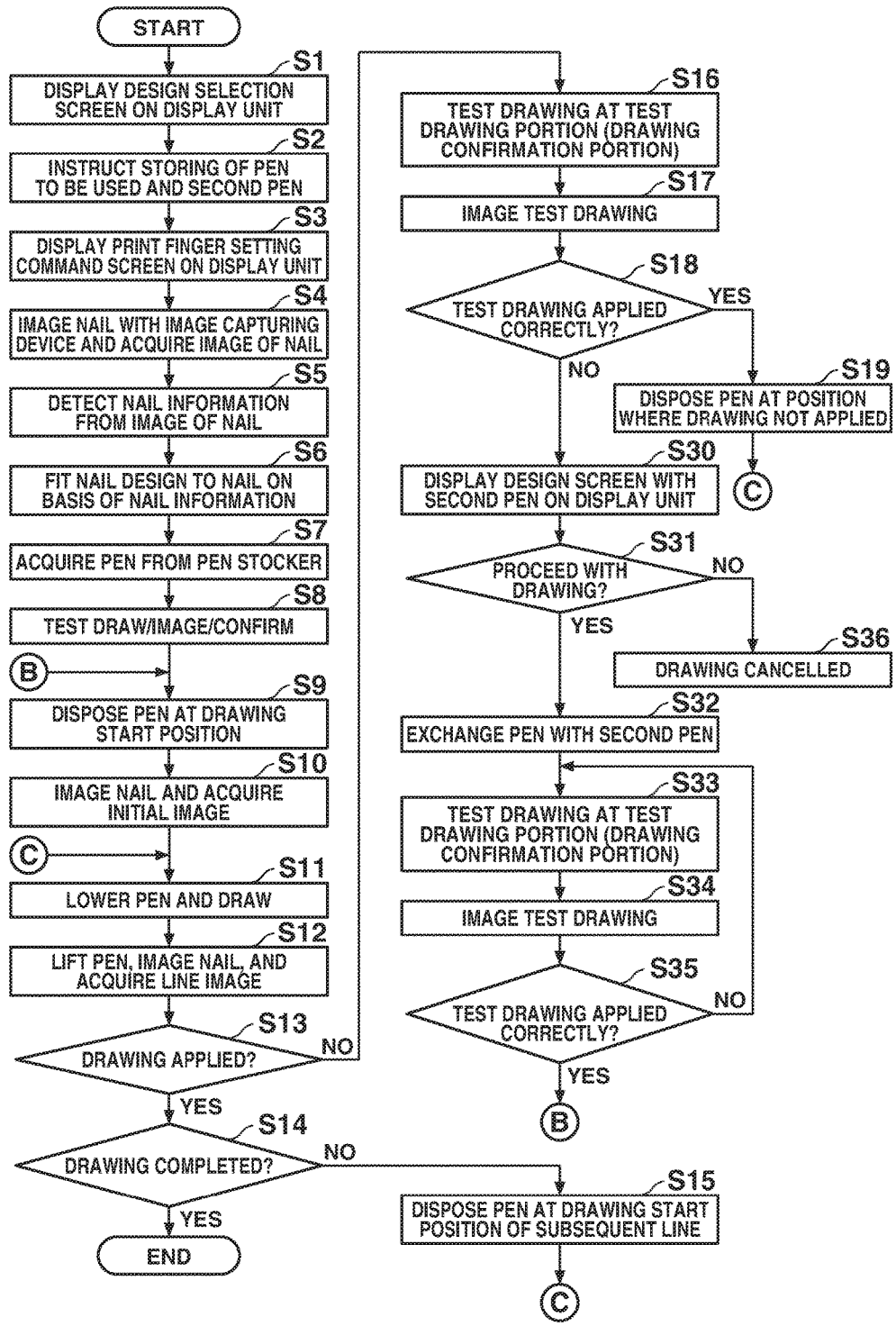
FIG. 9 is a flowchart showing drawing processing according to a third embodiment of the present invention.

Next, a drawing method by the nail printing apparatus 1 according to the present embodiment is described while referencing FIG. 9.

Note that steps S1 to S19 in FIG. 9 are the same as steps S1 to S19 in FIG. 7 of the first embodiment, and description thereof is omitted.

However, in step S2 in FIG. 9, the display control portion 814 causes the display unit 26 to display a command screen prompting that the pen 41 and the second pen 92 be stored in the pen stockers 64 and 65.

The user follows the commands displayed on the display screen and stores the pen 41 and the second pen 92 in the pen stockers 64 and 65.

In steps S17 and S18 in FIG. 9, the imaging control portion 811 causes the image capturing device 51 to image the results of the drawing on the drawing media 61a by the pen 41 in the test drawing portion (drawing testing portion) 61 (step S17).

Then, the drawing control portion 815 determines whether or not the drawing on the drawing media 61a by the pen 41 is performed correctly on the basis of the imaging results (step S18).

Then, in cases where the drawing control portion 815 determines that the drawing is not performed correctly (step S18; NO), the drawing control portion 815 exchanges the pen 41 in the pen holder 42 with the second pen 92 in the pen stocker 65 (steps S30 to S32).

In step S18, in cases where the test drawing (the drawing on the drawing media 61a) by the pen 41 is not performed correctly (step S18; NO), the display control portion 814 causes a design image to be displayed on the display unit 26 of a case where the drawing on the nail T is continued using the second pen 92 in place of the pen 41 (step S30), the design image being based on the information related to the second pen 92 that is stored in the pen information memory region 824; and causes the display unit 26 to display a command screen allowing a user to decide whether or not to continue the drawing on the nail T using the second pen 92 (step S31).

In cases where the user operates the operation buttons 251 or the like of the operation unit 25 and commands the continuation of the drawing on the nail T using the second pen 92 (step S31; YES), the drawing control portion 815 controls the head movement portion 49 to move the drawing head 43 near the pen stockers 64 and 65 of the home area 60.

Here, the drawing control portion 815 controls the exchanging unit 90 to move the pen 41 in the pen holder 42 to the pen stocker 64 and move the second pen 92 in the pen stocker 65 to the pen holder 42 (step S32).

That is, in step S32, the pen 41 in the pen holder 42 is exchanged with the second pen 92.

Thereafter, the drawing control portion 815 controls the head movement portion 49 and the pen vertical motor 426 of the lifting mechanism to move the drawing head 43 to the test drawing portion (the drawing testing portion), and apply test drawing (drawing on the drawing media 61a) by the second pen 92 on the drawing media 61a at the test drawing portion 61 (step S33).

Thereafter, the imaging control portion 811 controls the imaging unit 50 to image the region of the drawing media 61a where the test drawing has been performed by the second pen 92 using the image capturing device 51 (step S34). Then, the drawing control portion 815 determines whether or not the test drawing by the second pen 92 has been performed correctly on the basis of the imaging results.

In cases where the test drawing by the second pen 92 is not performed correctly (step S35; NO), the drawing control portion 815 and the imaging control portion 811 repeatedly execute the processing of steps S33 to S35 until the test drawing by the second pen 92 is performed correctly.

In cases where the test drawing by the second pen 92 is performed correctly (step S35; YES), the drawing control portion 815 executes the processing starting with step S9.

For example, in the examples illustrated in FIGS. 6B, 6C, and 6D, the pen 41 in the pen holder 42 is exchanged with the second pen 92 and, thereafter, the second pen 92 is caused to be disposed above the drawing start position α1 (step S9). Then, in the same manner as the drawing by the pen 41, drawing is resumed by the second pen 92. As a result, drawing by the second pen 92 is performed over the drawing by the pen 41 and the white base drawn by the pen 41 is covered by a light pink base (light pink base layer) drawn by the second pen 92.

Note that in the processing of step S15 after the exchanging of the pen 41 in the pen holder 42 with the second pen 92, the drawing control portion 815 determines the amount of movement of the drawing head 43 in the width direction W of the nail T on the basis of the information related to the second pen 92 that is stored in the pen information memory region 824.

On the other hand, in cases where the user operates the operation buttons 251 or the like of the operation unit 25 and commands that the drawing of the nail design not be performed (step S31; NO), the drawing control portion 815 cancels the drawing processing for the nail T (step S36).

According to the present embodiment, in cases where the test drawing by the pen 41 is not performed correctly, the pen 41 in the drawing head 43 is exchanged with the second pen 92 and the drawing on the nail T is resumed.

In this case as well, when one line of the drawing is defective as illustrated in FIG. 6B, when the drawing is defective from the start of one line to an intermediate point as illustrated in FIG. 6C, or when the drawing is defective from the intermediate point of one line as illustrated in FIG. 6D, the drawing of that line is resumed from the drawing start position and the defect in the drawing by the pen 41 is covered with the drawing by the second pen 92.

As a result, even in cases where ink runs out in the pen 41, the drawing on the nail T can be resumed and failures in the application of the nail design and the occurrence of declines in durability of the design can be reliably prevented.

Modification Example

The third embodiment may be modified as follows.

Figure 2C:
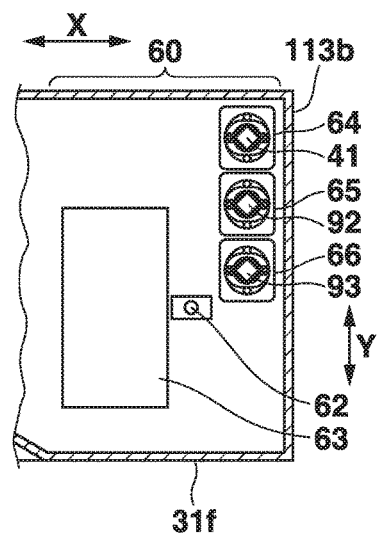

Specifically, as illustrated in FIG. 2C, three pen stockers 64, 65, and 66 may be provided in the home area 60, and a third pen 93 may be stored in the pen stocker 66.

The third pen 93 is a replacement pen of a different type that is used in place of the pen 41 in the same manner as the second pen 92.

The third pen 93 is of a different type than the second pen 92.

Information related to the third pen 93 such as the shape and thickness of the third pen 93 stored in the pen stocker 66, the type of ink stored, and the like is also stored in advance in the pen information memory region 824 (see FIG. 4) of the memory unit 82.

Figure 10:
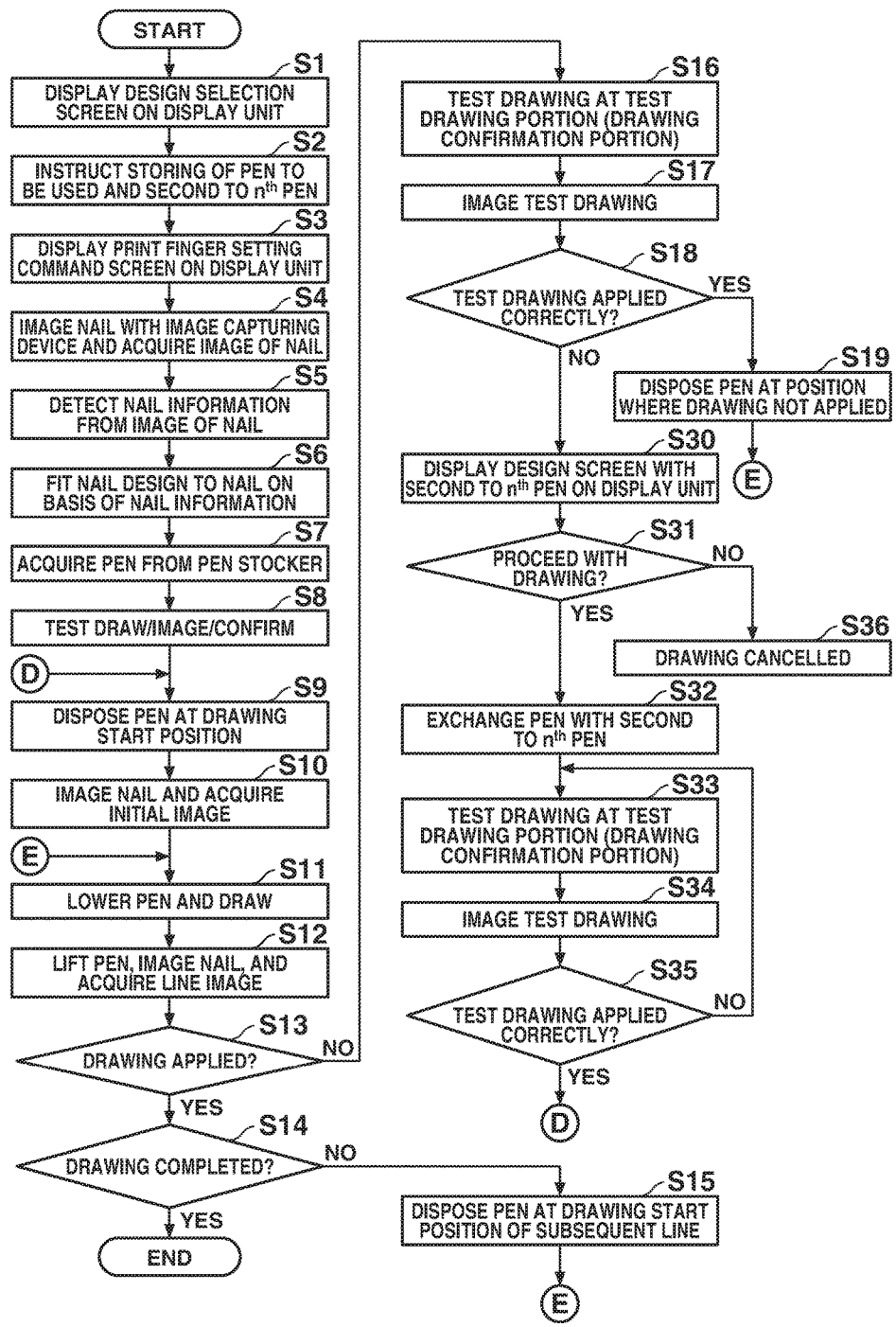
FIG. 10 is a flowchart showing a modification example of the drawing processing according to the third embodiment of the present invention.

In this case, as illustrated in FIG. 10, the display control portion 814 causes the display unit 26 to display a command screen prompting that the pen 41, the second pen 92, and the third pen 93 be stored in the pen stockers 64, 65, and 66.

The user follows the commands displayed on the display screen and stores the pen 41, the second pen 92, and the third pen 93 in the pen stockers 64, 65, and 66.

In steps S30 to S32, the display control portion 814 causes design images to be displayed on the display unit 26 of a case where the drawing on the nail T is continued using the second pen 92 in place of the pen 41 and of a case where the drawing on the nail T is continued using the third pen 93 in place of the pen 41 (step S30), the design images being based on the information related to the second pen 92 and the third pen 93 that is stored in the pen information memory region 824; and causes the display unit 26 to display a selection screen asking whether or not to continue the drawing on the nail T and which of the second pen 92 and the third pen 93 to use (step S31).

In cases where the user operates the operation buttons 251 or the like of the operation unit 25 and selects the continuation of the drawing using one of the second pen 92 and the third pen 93 (step S31; YES), the drawing control portion 815 controls the head movement portion 49 to move the drawing head 43 near the pen stockers 64, 65, and 66 of the home area 60, and controls the exchanging unit 90 to move the pen 41 in the pen holder 42 to the pen stocker 64 and move one of the second pen 92 in the pen stocker 65 and the third pen 93 in the pen stocker 66 to the pen holder 42 (step S32).

That is, in step S32, the pen 41 in the pen holder 42 is exchanged with one of the second pen 92 and the third pen 93.

Note that in the processing of step S15 after the exchanging of the pen 41 in the pen holder 42 with the third pen 93, the drawing control portion 815 determines the amount of movement in the width direction W of the nail T on the basis of the information related to the third pen 93 that is stored in the pen information memory region 824.

On the other hand, in cases where the user operates the operation buttons 251 or the like of the operation unit 25 and commands that the drawing by either the second pen 92 or the third pen 93 not be performed (step S31; NO), the drawing control portion 815 cancels the drawing processing for the nail T (step S36).

According to the modification example described above, in cases where the test drawing by the pen 41 is not performed correctly, the user is given an option to continue the drawing by the second pen 92 or continue the drawing by the third pen 93 and the drawing on the nail T is resumed on the basis of the selection of the user.

Therefore, the degree of freedom with respect to the drawing on the nail T increases and, in cases where the pen 41 runs out of ink, variations of the drawing can be proposed to the user at a time of resuming the drawing on the nail T.

Note that in the present modification example, an example has been given in which the pen stocker 66 is added and the third pen 93 is stored therein. However, second to $n^{th}$ pen stockers (where n is an integer greater than or equal to three) may be further added and second to $n^{th}$ pens may be stored therein. The user may be given an option of drawings by the second to $n^{th}$ pens and the pen 41 may be exchanged with one of the second to $n^{th}$ pens and the drawing on the nail T may be resumed on the basis of this selection by the user.

The embodiment described above is for the purpose of elucidating the present invention and is not to be construed as limiting the present invention. The invention can of course be altered and improved without departing from the gist thereof.

In the second embodiment described above, an example in which the pen 41 is exchanged with the spare pen 91 is given, and in the third embodiment (including the modification example) described above, an example in which the pen 41 is exchanged with the second to $n^{th}$ pen is given. However, a configuration is possible in which a pen stocker capable of storing all of the pen 41, the spare pen 91, and the second to $n^{th}$ pens is disposed in the home area 60 and, on the basis of a selection by a user, the pen 41 is exchanged with any one of the spare pen 91 and the second to $n^{th}$ pens and, thereafter, the drawing on the nail T is resumed.

In this case, for example, in a case where the test drawing by the pen 41 is not performed correctly, first, the pen 41 is exchanged with the spare pen 91, and then the drawing on the nail T is resumed. Thereafter, when the test drawing by the pen 91 is no longer performed correctly, the spare pen 91 is exchanged with any one of the second to $n^{th}$ pens, and then the drawing on the nail T is resumed.

In each of the embodiments described above, examples have been given in which the pen (including the pen 41, the spare pen 91, and the second to $n^{th}$ pens) draws a line by moving only in a single direction. However, a configuration is possible in which the drawing direction of the line changes.

For example, in the example illustrated in FIG. 6A, the drawing direction of the line may be configured to change as follows (in a zigzag manner):

drawing start position $\alpha 1 \rightarrow$ drawing end position $\beta 1 \rightarrow$ drawing end position $\beta 2 \rightarrow$ drawing start position $\alpha 2 \rightarrow$ drawing start position $\alpha 3 \rightarrow$ drawing end position $\beta 3$ . . . .

In this case, the initial image G0 is acquired above the drawing start position $\alpha 1$, the line image G1 is acquired above the drawing end position $\beta 1$, the line image G2 is acquired above the drawing start position $\alpha 2$, and the line image G3 is acquired above the drawing end position $\beta 3$.

In each of the embodiments described above, examples are given in which upon completion of the drawing of one line, that line is imaged, and it is determined whether or not that line has been drawn correctly. However, the determination of the correctness of the drawing may be performed upon the completion of the drawing of a plurality of lines. Alternatively, the drawing of the lines may be repeatedly imaged by the image capturing device 51 in real-time.

In the case of imaging in real-time, preferably the line is imaged on a frame basis each time a set period of time passes, frame images before and after the imaging are compared, and determination is made as to whether or not the line is drawn correctly.

In each of the embodiments described above, examples have been given of a case where the drawing head 43 is provided with one pen holder 42. However, the number of the pen holders 42 is not limited to one.

For example, a configuration is possible in which the drawing head 43 may be provided with two or more pen holders 42 and two or more pens (including the pen 41, the spare pen 91, and the second to $n^{th}$ pens) are simultaneously held.

In this case, there is no need to exchange the pens at the home area 60 and drawing on the nail T can be quickly resumed even in cases where the defects in the drawing illustrated in FIGS. 6B, 6C, and 6D exist, and the drawing time for the entirety of the nail T can be shortened.

In each of the embodiments described above, examples have been given of a case where the image capturing device 51 and the illumination device 52 are mounted on the drawing head 43. However, the location where the image capturing device 51 and the illumination device 52 are provided is not limited thereto.

For example, a configuration is possible in which the image capturing device 51 and the illumination device 52 are fixedly disposed at a ceiling portion or the like of the nail printing apparatus 1.

In this case, it is necessary to provide at least two of the image capturing devices 51, one at a position where the nail T can be imaged and the initial image and the line images can be acquired, and the other at a position where it is possible to determine whether or not the test drawing at the test drawing portion 61 is performed correctly.

In each of the embodiments described above, an example has been given of the nail printing apparatus 1 in which fingers are inserted into the apparatus one finger at a time and drawing is performed sequentially. However, the present invention can also be performed to an apparatus in which consecutive drawing and/or removal of ink can be performed on a plurality of fingers, without the need to insert and remove each finger.

For example, by broadening the operating range of the pens so as to enlarge the drawable area, drawings can be performed consecutively on the nail of each finger and ink can be removed in a state where a plurality of the print fingers U1 is simultaneously inserted.

Some embodiments of the present invention have been described above. However, the embodiments described above are not to be construed as limiting the scope of the present invention and include the scope of the invention recited in the claims and equivalents.

The invention claimed is:

1. A drawing apparatus comprising:
    a drawing head to which a drawing tool for drawing on a drawing object is exchangeably mounted;
    a stocker for storing at least one drawing tool;
    an exchanging unit capable of exchanging the drawing tool mounted to the drawing head with the drawing tool stored in the stocker;
    a drawing testing portion which has a drawing media on which an image is to be drawn by the drawing tool mounted to the drawing head; and
    a processor;
    wherein:
    when a first drawing tool is mounted to the drawing head and a second drawing tool that is a different type than the first drawing tool is stored in the stocker, and the drawing on the drawing object by the first drawing tool is not performed correctly, the processor interrupts drawing on the drawing object by the first drawing tool and attempts drawing on the drawing media by the first drawing tool in the drawing testing portion, and the processor prompts a user to decide whether or not to exchange the first drawing tool mounted to the drawing head with the second drawing tool stored in the stocker by using the exchanging unit when the processor determines that the drawing on the drawing media by the first drawing tool is not performed correctly.

2. The drawing apparatus according to claim 1, further comprising:
    a camera which images an object;
    wherein the processor determines whether or not the drawing on the drawing object by the first drawing tool is performed correctly based on a result of imaging of the drawing object by the camera while the first drawing tool is caused to perform the drawing on the drawing object.

3. The drawing apparatus according to claim 1, further comprising:
    a camera which images an object;
    wherein:
    the processor determines whether or not the drawing on the drawing media is performed correctly after the attempting of the drawing on the drawing media by the first drawing tool in the drawing testing portion, based on a result of imaging the drawing media by the camera; and
    the processor resumes the drawing on the drawing object by the first drawing tool when the processor determines that the drawing on the drawing media is performed correctly.

4. The drawing apparatus according to claim 3, further comprising:
    a display;
    wherein the processor displays a command prompting the user to replace the first drawing tool when the processor determines that the drawing on the drawing media by the first drawing tool is not performed correctly.

5. The drawing apparatus according to claim 1, further comprising:
    a camera which images an object;
    wherein:
    when a third drawing tool that is of a same type as the first drawing tool, and that can be a replacement for the first drawing tool is stored in the stocker, the processor:
        determines whether or not the drawing on the drawing media is performed correctly after the attempting of the drawing on the drawing media by the first drawing tool in the drawing testing portion, based on a result of imaging the drawing media by the camera; and
        exchanges the first drawing tool mounted to the drawing head with the third drawing tool stored in the stocker using the exchanging unit when the processor determines that the drawing on the drawing media by the first drawing tool is not performed correctly.

6. The drawing apparatus according to claim 5, wherein the processor:
    attempts the drawing on the drawing media by the third drawing tool in the drawing testing portion after exchanging the first drawing tool on the drawing head with the third drawing tool using the exchanging unit;
    determines whether or not the drawing on the drawing media by the third drawing tool is performed correctly, based on a result of imaging the drawing media by the camera; and
    resumes the first drawing on the drawing object by the third drawing tool when the processor determines that the drawing on the drawing media by the third drawing tool is performed correctly.

7. The drawing apparatus according to claim 1, further comprising:
    a camera which images an object; and
    a display;
    wherein the processor:
    determines whether or not the drawing on the drawing media is performed correctly after the attempting of the drawing on the drawing media by the first drawing tool in the drawing testing portion, based on a result of imaging the drawing media by the camera; and
    when the processor determines that the drawing on the drawing media is not performed correctly, generates and causes the display to display an image expected to be drawn on the drawing object when the drawing on the drawing object is continued by the second drawing tool, and causes the display to display a command prompting the user to decide whether or not to continue the drawing on the drawing object by the second drawing tool.

8. The drawing apparatus according to claim 7, wherein the processor:
- exchanges the first drawing tool mounted to the drawing head with the second drawing tool stored in the stocker using the exchanging unit when the user commands that the drawing by the second drawing tool be continued;
- attempts drawing on the drawing media by the second drawing tool in the drawing testing portion after exchanging the first drawing tool on the drawing head with the second drawing tool using the exchanging unit;
- determines whether or not the drawing on the drawing media is performed correctly, based on a result of imaging the drawing media by the camera; and
- resumes the drawing on the drawing object by the second drawing tool when the processor determines that the drawing on the drawing media is performed correctly.

9. The drawing apparatus according to claim 7, wherein:
the stocker stores a plurality of the second drawing tools, and each of the plurality of second drawing tools is of a different type from each other; and
the processor:
- when determination is made that the drawing on the drawing media is not performed correctly, generates and displays on the display a plurality of images expected to be drawn on the drawing object when the drawing on the drawing object is continued by each of the plurality of second drawing tools and displays on the display a command prompting the user to decide whether or not to continue the drawing, and with which of the plurality of second drawing tools;
- when the user commands that the drawing be continued by a specific drawing tool of the plurality of second drawing tools, exchanges the first drawing tool mounted to the drawing head with the specific drawing tool of the plurality of second drawing tools stored in the stocker by the exchanging unit;
- attempts drawing on the drawing media by the specific drawing tool in the drawing testing portion after the first drawing tool on the drawing head has been exchanged with the specific drawing tool by the exchanging unit;
- determines whether or not the drawing on the drawing media is performed correctly based on a result of imaging the drawing media by the camera; and
- resumes the drawing on the drawing object by the specific drawing tool when the drawing on the drawing media is determined to be performed correctly.

10. A drawing method for a drawing apparatus, the drawing apparatus comprising: a drawing head to which a drawing tool for drawing on a drawing object is exchangeably mounted; a stocker for storing at least one drawing tool; an exchanging unit capable of exchanging the drawing tool mounted to the drawing head with the drawing tool stored in the stocker; and a drawing testing portion which has a drawing media on which an image is to be drawn by the drawing tool mounted to the drawing head;
wherein, when a first drawing tool is mounted to the drawing head, and a second drawing tool that is a different type than the first drawing tool is stored in the stocker, the drawing method comprises:
interrupting drawing on the drawing object by the first drawing tool and attempting drawing on the drawing media by the first drawing tool in the drawing testing portion when the drawing on the drawing object by the first drawing tool is not performed correctly; and
prompting a user to decide whether or not to exchange the first drawing tool with the second drawing tool by using the exchanging unit when determination is made that the drawing on the drawing media by the first drawing tool is not performed correctly.

11. The drawing method for a drawing apparatus according to claim 10, wherein the drawing apparatus further comprises:
a camera which images an object; and
the drawing method further comprises:
determining whether or not the drawing on the drawing object by the first drawing tool is performed correctly based on a result of imaging of the drawing object by the camera while the first drawing tool is caused to perform the drawing on the drawing object.

12. The drawing method for a drawing apparatus according to claim 10, wherein:
the drawing apparatus further comprises:
a camera which images an object; and
the drawing method further comprises:
determining whether or not the drawing on the drawing media is performed correctly after the attempting of the drawing on the drawing media by the first drawing tool in the drawing testing portion, based on a result of imaging the drawing media by the camera; and
resuming the drawing on the drawing object by the first drawing tool when determination is made in the determining of whether or not the drawing on the drawing media is performed correctly that the drawing on the drawing media is performed correctly.

13. The drawing method for a drawing apparatus according to claim 12, wherein:
the drawing apparatus further comprises:
a display; and
the drawing method further comprises:
displaying a command prompting the user to replace the first drawing tool when determination is made in the determining of whether or not the drawing on the drawing media is performed correctly that the drawing on the drawing media by the first drawing tool is not performed correctly.

14. The drawing method for a drawing apparatus according to claim 10, wherein:
the drawing apparatus further comprises:
a camera which images an object; and
when a third drawing tool that is of a same type as the first drawing tool, and that can be a replacement for the first drawing tool is stored in the stocker, the drawing method further comprises:
- determining whether or not the drawing on the drawing media is performed correctly after the attempting of the drawing on the drawing media by the first drawing tool in the drawing testing portion, based on a result of imaging the drawing media by the camera; and
- exchanging the first drawing tool mounted to the drawing head with the third drawing tool stored in the stocker using the exchanging unit when determination is made in the determining of whether or not the drawing on the drawing media by the first drawing tool is performed correctly that the drawing on the drawing media by the first drawing tool is not performed correctly.

15. The drawing method for a drawing apparatus according to claim 14, the drawing method further comprising:
attempting drawing on the drawing media by the third drawing tool in the drawing testing portion after exchanging the first drawing tool on the drawing head with the third drawing tool using the exchanging unit;

determining whether or not the drawing on the drawing media by the third drawing tool is performed correctly, based on a result of imaging the drawing media by the camera; and resuming the drawing on the drawing object by the third drawing tool when determination is made in the determining of whether or not the drawing on the drawing media by the third drawing tool is performed correctly that the drawing on the drawing media by the third drawing tool is performed correctly.

16. The drawing method for a drawing apparatus according to claim 10, wherein:

the drawing apparatus further comprises:

a camera which images an object; and a display; and the drawing method further comprises:

determining whether or not the drawing on the drawing media is performed correctly after the attempting of the drawing on the drawing media by the first drawing tool in the drawing testing portion, based on a result of imaging the drawing media by the camera; and when determination is made in the determining of whether or not the drawing on the drawing media is performed correctly that the drawing on the drawing media is not performed correctly, generating and displaying on the display an image expected to be drawn on the drawing object when the drawing on the drawing object is continued by the second drawing tool, and displaying on the display a command prompting the user to decide whether or not to continue the drawing on the drawing object by the second drawing tool.

17. The drawing method for a drawing apparatus according to claim 16, the drawing method further comprising:

exchanging the first drawing tool mounted to the drawing head with the second drawing tool stored in the stocker using the exchanging unit when the user commands that the drawing by the second drawing tool be continued;

attempting drawing on the drawing media by the second drawing tool in the drawing testing portion after exchanging the first drawing tool on the drawing head with the second drawing tool using the exchanging unit;

determining whether or not the drawing on the drawing media is performed correctly, based on a result of imaging the drawing media by the camera; and resuming the drawing on the drawing object by the second drawing tool when determination is made in the determining of whether or not the drawing on the drawing media is performed correctly that the drawing on the drawing media is performed correctly.

18. The drawing method for a drawing apparatus according to claim 16, wherein:

the stocker stores a plurality of the second drawing tools, and each of the plurality of second drawing tools is of a different type from each other; and the drawing method further comprises:

when determination is made that the drawing on the drawing media is not performed correctly, generating and displaying on the display a plurality of images expected to be drawn on the drawing object when the drawing on the drawing object is continued by each of the plurality of second drawing tools and displaying on the display a command prompting the user to decide whether or not to continue the drawing, and with which of the plurality of second drawing tools;

when the user commands that the drawing be continued by a specific drawing tool of the plurality of second drawing tools, exchanging the first drawing tool mounted to the drawing head with the specific drawing tool of the plurality of second drawing tools stored in the stocker using the exchanging unit;

attempting drawing on the drawing media by the specific drawing tool in the drawing testing portion after the first drawing tool on the drawing head has been exchanged with the specific drawing tool by the exchanging unit;

determining whether or not the drawing on the drawing media is performed correctly, based on a result of imaging the drawing media by the camera; and resuming the drawing on the drawing object by the specific drawing tool when determination is made in the determining of whether or not the drawing on the drawing media is performed correctly that the drawing on the drawing media is performed correctly.

19. A drawing apparatus comprising:

a drawing head to which a drawing tool for drawing on a drawing object is exchangeably mounted;

a stocker for storing at least one drawing tool;

an exchanging unit capable of exchanging the drawing tool mounted to the drawing head with the drawing tool stored in the stocker;

a drawing testing portion which has a drawing media on which an image is to be drawn by the drawing tool mounted to the drawing head; and a processor which interrupts drawing on the drawing object when a first drawing tool is mounted to the drawing head, and the drawing on the drawing object by the first drawing tool is not performed correctly, and attempts drawing on the drawing media by the first drawing tool in the drawing testing portion, wherein:

(i) when the processor determines that the drawing on the drawing media is not performed correctly, and a second drawing tool that is a different type than the first drawing tool is stored in the stocker, the processor prompts a user to decide whether or not to exchange the first drawing tool mounted to the drawing head with the second drawing tool stored in the stocker using the exchanging unit, and (ii) when the processor determines that the drawing on the drawing media is not performed correctly, and a third drawing tool that is a same type as the first drawing tool, and that can be a replacement for the first drawing tool is stored in the stocker, the processor causes the first drawing tool mounted to the drawing head to be exchanged with the third drawing tool stored in the stocker using the exchanging unit.

20. A drawing method for a drawing apparatus, the drawing apparatus comprising: a drawing head to which a drawing tool for drawing on a drawing object is exchangeably mounted; a stocker for storing at least one drawing tool; an exchanging unit capable of exchanging the drawing tool mounted to the drawing head with the drawing tool stored in the stocker; and a drawing testing portion which has a drawing media on which an image is to be drawn by the drawing tool mounted to the drawing head, wherein the drawing method comprises:

interrupting drawing on the drawing object when a first drawing tool is mounted to the drawing head, and the drawing on the drawing object by the first drawing tool is not performed correctly, and attempting drawing on the drawing media by the first drawing tool in the drawing testing portion;

when determination is made that the drawing on the drawing media is not performed correctly, and a second drawing tool that is a different type than the first drawing tool is stored in the stocker, prompting a user to decide whether or not to exchange the first drawing tool mounted to the drawing head with the second drawing tool stored in the stocker using the exchanging unit; and when determination is made that the drawing on the drawing media is not performed correctly, and a third drawing tool that is a same type as the first drawing tool, and that can be a replacement for the first drawing tool is stored in the stocker, causing the first drawing tool mounted to the drawing head to be exchanged with the third drawing tool stored in the stocker using the exchanging unit.

* * * * *